US005434991A

United States Patent [19]

Maeda et al.

[11] Patent Number: 5,434,991
[45] Date of Patent: Jul. 18, 1995

[54] METHOD AND APPARATUS FOR RECORDING AND REPRODUCING INFORMATION IN BLACK ON A REWRITABLE RECORDING MEDIUM

[75] Inventors: Shigemi Maeda, Yamatokoriyama; Kunio Kojima, Nara; Kazuaki Okumura; Shigeo Terashima, both of Tenri, all of Japan

[73] Assignee: Sharp Kabushiki Kaisha, Osaka, Japan

[21] Appl. No.: 671,978

[22] Filed: Mar. 19, 1991

[30] Foreign Application Priority Data

| Mar. 20, 1990 | [JP] | Japan | 2-70395 |
| Mar. 20, 1990 | [JP] | Japan | 2-70396 |
| Mar. 30, 1990 | [JP] | Japan | 2-87024 |
| Mar. 30, 1990 | [JP] | Japan | 2-87025 |
| Apr. 3, 1990 | [JP] | Japan | 2-89738 |

[51] Int. Cl.⁶ .................. G06F 12/02; G06F 11/00; G11B 17/22
[52] U.S. Cl. .................. 395/425; 369/32; 369/59; 371/37.5; 371/40.1
[58] Field of Search .......... 395/425; 369/32, 59; 371/37.5, 40.1

[56] References Cited

U.S. PATENT DOCUMENTS

| Re. 33,462 | 11/1990 | Suzuki et al. | 371/37.5 |
| 4,633,392 | 12/1986 | Vincent et al. | 364/200 |
| 4,729,043 | 3/1988 | Worth | 358/342 |
| 4,755,980 | 7/1988 | Yoshimaru et al. | 369/54 |
| 4,802,152 | 1/1989 | Markvoort et al. | 369/32 |
| 4,870,634 | 9/1989 | Sakagami | 369/47 |
| 4,907,216 | 3/1990 | Rijinsburger | 369/275 |
| 4,977,550 | 12/1990 | Furuya et al. | 369/32 |
| 4,980,850 | 12/1990 | Morgan | 364/900 |
| 4,998,252 | 3/1991 | Suzuki et al. | 371/37.5 |
| 5,060,221 | 10/1991 | Sako et al. | 369/59 |

FOREIGN PATENT DOCUMENTS

| 144813 | 6/1985 | European Pat. Off. . |
| 0158067 | 10/1985 | European Pat. Off. . |
| 0328240 | 8/1989 | European Pat. Off. . |
| 57-40760 | 3/1982 | Japan . |
| 59-144012 | 8/1984 | Japan . |
| 63-136360 | 6/1988 | Japan . |
| 64-55787 | 3/1989 | Japan . |
| 1184763 | 7/1989 | Japan . |
| 2122488 | 5/1990 | Japan . |
| 2206723 | 1/1989 | United Kingdom . |
| WO85/01380 | 3/1985 | WIPO . |
| WO87/04838 | 8/1987 | WIPO . |

OTHER PUBLICATIONS

"The Art of Digital Audio" by John Watkinson, Jan. 1988 Focal Press, U.K./Preface, Contents & Chapter 13.

Primary Examiner—David L. Robertson
Assistant Examiner—B. James Peikari

[57] ABSTRACT

An information recording and reproducing device uses a recording medium which is provided with units composed of blocks and a unit information recording area which includes unit allocation information, sector number information indicating the number of sectors per unit and unit number information identifying each unit. When the recording medium is placed in the device, the respective information is read by a calculating unit which calculates physical sector numbers corresponding to a block specified for recording and reproduction operations. Access operations are performed to the calculated sectors, which allows the desired information to be recorded. The block includes dummy sectors which are added before and after each group of predetermined numbers of effective sectors. When high-volume information is recorded over several blocks, the dummy sectors may be provided only for the first and last blocks. The device records a group of information whose volume varies from the smallest block number toward the larger block numbers, while it records a group of information whose volume is fixed from the largest block number. Thus, the recording area is effectively used. The device easily conducts the information management when a host device specifies a block. The file management may be executed by providing a unit for recording file management information separately from a unit for recording files.

6 Claims, 21 Drawing Sheets

FIG. 14

| PHYSICAL SECTOR NO. | BLOCK NO. | TRACK NO. |
|---|---|---|
| 01:22:73 | XX | XX |
| 01:22:74 | | |
| 01:23:00 | | |
| ∫ | 0 | |
| 01:23:07 | | |
| 01:23:08 | | |
| ∫ | 1 | 1 |
| 01:23:15 | | |
| ∫ | ∫ | |
| 09:22:67 | | |
| ∫ | 4499 | |
| 09:22:74 | | |
| ∫ | XX | XX |
| 09:24:00 | | |
| 09:24:01 | | |
| ∫ | 0 | |
| 09:24:11 | | |
| ∫ | ∫ | 2 |
| 29:23:63 | | |
| ∫ | 7499 | |
| 29:23:73 | | |
| 29:23:74 | | |
| ∫ | XX | XX |
| 29:25:00 | | |
| 29:25:01 | | |
| ∫ | 0 | |
| 29:25:14 | | |
| 29:25:15 | | |
| ∫ | ∫ | 3 |
| 57:24:59 | | |
| 57:24:60 | | |
| ∫ | 7874 | |
| 57:24:73 | | |
| 57:24:74 | | |
| 57:25:00 | | |

LARGER BLOCK NOS.

LARGER BLOCK NOS.

METHOD AND APPARATUS FOR RECORDING AND REPRODUCING INFORMATION IN BLACK ON A REWRITABLE RECORDING MEDIUM

FIELD OF THE INVENTION

The present invention relates to an information recording and reproducing device which records and reproduces various forms of information on recordable recording media such as various types of rewritable optical disks using the so-called non-complete interleaving method.

DESCRIPTION OF THE BACKGROUND ART

Conventionally, so-called compact disks (hereinafter referred to as CDs) have been used widely, on which successive data such as music information is recorded as digital signals in the form of optically detectable minute pits. The information on the CDs is reproducible through CD players for only reproduction.

FIG. 18 and FIG. 19 are schematic views illustrating a signal format to be used in the CDs. As shown in FIG. 8, a frame 31a of a recording signal is composed of a frame synchronization signal 31b indicating the leading portion of the frame, a sub-code 31c (described later) which is additional information of data, and a data field 31d comprising 24 bytes of main data and 8 bytes of error detection and correction parity added thereto. Errors in the data field 31d are detected and corrected based on an error detection and correction method employing a non-complete interleaving method, called Cross Interleaved Reed Solomon Code (CIRC).

As shown in FIG. 19, sub-codes 31c of 98 frames form a sub-coding block 32c. The 98 frames form a sector 32a (one sub-cording frame). Track numbers (the numbers of pieces of music if the data is music information) and absolute address information on the disk are determined based on the sub-coding block 32c. A frame synchronization signal 32b and a data field 32d respectively include 98 frames of the synchronization signals 31b and data fields 31d of FIG. 18.

If the length of the sector 32a, i.e. a sector length, equals for example 13.3 (ms), 75 sectors equal one second. In this case, sector numbers on the disk can be described as a function of time, "minute": "second": "a sector number in one second" (i.e. taking a value from 0 to 74), and the sector numbers form time information and address information which consecutively increase from the innermost portion outward of the disk.

FIG. 17 is a typical depiction illustrating an area allocation on the CD. A disk 33 comprises a main information recording area 33a and a Table Of Contents (TOC) area 33b (shown by hatching for convenience' sake). The main information recording area 33a stores main information such as music information and sub-code sector numbers, and the TOC area 33b stores sub-code additional information relating to respective information recorded in the main information recording area 33a, such as the track number and the recording start sector number of each track.

According to the format, when the disk 33 is placed into the CD player, sub-code information in the TOC area 33b is read and then the number of main information (equivalent to the number of music pieces in the case of music information) and sector numbers indicating the recording start positions of the respective information are recognized. Access to a desired track is promptly carried out upon receiving instructions to perform reproduction operation by verifying that the sub-code information read out from the TOC area 33b coincides with the sub-code sector number recorded in the main information recording area 33a.

In the CD, since information is recorded using the Constant Linear Velocity (hereinafter referred to as CLV) method, the recording density is uniform independently of any radial location on the disk 33, thereby permitting the recording volume to increase. During reproduction by the CD player, actually the CLV control is achieved by, for example, controlling the rotation of the disk 33 so that the interval of the frame synchronization signals in a reproduced signal from the CD recorded in the signal format equals a reference value.

In the mean time, in case various types of information including music information and computer information are recorded on rewritable optical disks such as magneto-optical disks having been developed recently, it is desirable to provide an information recording and reproducing device having compatibility of reproduction method with the conventional CDs and Compact Disk Read Only Memory (CD-ROM).

In this case, especially, for an optical disk whereon no information is recorded, absolute addresses using a sub-code in the signal format for CD and frame synchronization signals which can be used for the CLV control do not exist. Consequently, access operations to desired sectors can not be executed before recording operations and the CLV control required during recording and reproduction can not be achieved.

To counteract the above problem, the following method for recording absolute addresses without using sub-codes was suggested. In this method, absolute addresses go through a bi-phase mark modulation process, and guiding grooves of an optical disk are deviated inward or outward in a radial direction of the disk or the widths of the guiding grooves are varied according to "0" or "1" of the respective bits (see U.S. Pat. No. 4,907,216).

In the method, if the frequency band of absolute addresses having gone through the bi-phase mark modulation process varies from the frequency band of recording information having gone through the Eight to Fourteen Modulation (EFM) process, it is possible to reproduce them individually. In addition, access operations to portions wherein no recording information is contained can be performed by using the absolute addresses which were recorded by, for example, deviating the guiding grooves of the disk. As for the CLV control, an accurate velocity control is fulfilled by using reproduction carrier components of the absolute addresses, and the CLV control can also be performed in recording operations.

Rewritable optical disks having compatibility with CDs are expected to be used, especially in typical families, as high-density information recording media whereon various kinds of information such as music, text and image information can be recorded.

For example, the rewritable optical disks may be used as recording media for electronic still cameras, whereon voice information can be recorded.

Conventionally, electronic still cameras having an ability to record some comments on each still picture, use so-called floppy disks as recording media. Therefore, in case rewritable optical disks are used as recording media, image and voice information may be allocated on the disks in the same way as the floppy disks.

As shown in FIG. 20, in a method for allocating image and voice information, image information recording areas I1, I2 ... (the volume as a function of time is, for example three to four seconds per picture) and voice information recording areas A1, A2 ... (for example about ten seconds per picture) can be allocated alternatively in the recording area, and the capacity of the respective voice information recording areas A1, A2 ... per picture can be fixed.

In this case, however, some problems may arise, for instance, the utility factor of the information recording areas A1, A2 ... decreases when the actual voice information is shorter than the information recording areas A1, A2 ... or on the contrary the actual voice information can not be stored in the respective information recording areas. Especially, when no voice information is recorded, the utility factor drops to a large degree.

To counteract the above kind of problem, as shown in FIG. 21, the image information recording areas I1, I2 ... and the voice information recording areas A1, A2 ... are allocated alternatively and the capacity of the voice information recording areas A1, A2 ... is varied, so that a desired length of voice information can be recorded for each still picture.

In this case, the utility factor of the recording area can improve. However, one restriction is imposed when rewriting voice information. Namely, since image information recorded a latter portions need to be protected, new information to be recorded can not be longer than the formerly recorded voice information.

Moreover, when unnecessary voice information is erased, blank areas which were the prior voice information recording areas A1, A2 ... are present. However, since the length of each area is different from another, if image information is recorded in the areas, the utility factor becomes low and the address management becomes complicated.

In the mean time, when rewriting information by the use of the signal format for CD, a piece of information recorded in a target physical sector is actually divided into a plurality of pieces and recorded in various sectors on the disk by CIRC. Therefore, it is difficult to rewrite information by only rewriting the desired sector. In fact, data desired to be rewritten and data recorded just before and after the desired data are stored in the same sector on the disk, and the connection or relationship of error correction is given between the respective data. Therefore, it is difficult to keep the connection in the case where only the desired data is rewritten (see Japanese published Patent Official Gazette, Tokukaihei 1-55787 for more details). In other words, all the recording information is recorded successively in the CD format. However, if a part of recorded data is rewritten, the connection of error correction between the data and data recorded just before and after the recorded data is lost in the vicinity of the recording start and end positions of the rewritten data, causing frequent reproduction errors. The reasons for this is that since the minimum access unit to the information recording position is a sector, sectors to which the user can not access exist in front and after the rewritten information. As a result, the utility factor of the disk decreases.

In order to prevent such reproduction errors from occurring, for example, additional sectors wherein dummy data is recorded may be provided before and after data to be actually recorded and reproduced. The dummy data comprises parity codes for correcting errors which may occur in the leading and ending parts of the data. For example, in the case of the CD format, to demonstrate the full correction ability of CIRC, i.e. to transmit codes in the non-complete interleaving method, 105 frames are required. Therefore, it is desirable to provide $(105/98) \approx 1.07$ sectors each before and after a sector comprising 98 frames. i.e. two additional sectors each practically. The additional sectors can be used as sectors where a Phase Locked Loop (PLL) can execute pull-in operations. However, providing the additional sectors results in the decrease in the utility factor of the disk.

In order to carry out address management or the like easily when rewriting information, every predetermined numbers of the sectors form a block, and for example two additional sectors described above may be provided at the lead and end of each block so as to rewrite information block by block (hereinafter referred to as by the block unit).

However, if the additional sectors are provided for every block, when high-volume data is recorded in a number of sectors, the respective additional data needs to be recorded in each additional sector provided for the blocks. Consequently, the utility factor of the disk and the data transmission speed drop.

To reduce the drop in the utility factor of the disk caused by providing additional sectors to the minimum degree, the number of sectors forming the minimum unit of rewritten a piece of information (hereinafter referred to as block) should be increased. As a result, the utility factor of the disk comes close to the primary utility factor of CDs. However, it is unsuitable to form blocks composed of sufficiently large numbers of sectors for every kind of information, for example low-volume data such as text information, and also the time taken for recording is wastefully prolonged.

Arranging the sizes (the number of sectors per block) of the blocks as above has both merits and demerits according to the content of information to be recorded. When the CLV format for CD is adopted, if a recording operation and a reproduction operation for verification are repeatedly performed by the block unit, the wait time between the completion of the recording operation and the start of the reproduction operation for verification is undesirably prolonged at an outer part of the disk, especially when the length of one block is shorter than the time taken for one disk rotation.

In order to explain the above, the time chart of FIG. 22 shows an example of a recording operation and a reproduction operation for verification successively performed by the block unit by using a conventional disk whereon recording can be executed in the CLV method. The periods shown by $t_o$ and $t_n$ of the figure indicate time required for each rotation of the disk at respective information positions, $W_o$ indicates a recording operation to block No. 0 located in the innermost portion of the disk, $W_n$ a recording operation to block No. n located in the outermost portion thereof, and $R_n$ a reproduction operation for verification of block No. n after the recording operation.

Wait time for rotating the disk to proceed to the reproduction operation for verification after the recording operation is obtained by subtracting the operation time $W_o$ (or $W_n$) from the time $t_o$ (or $t_n$) required for one disk rotation. It can be seen from FIG. 22 that the wait time for rotating the disk in an outer part of the disk shown in (b) is longer than the wait time in an inner part thereof shown in (a). In other words, the information volume per time, i.e the data transmission rate, decreases at outer parts of the disk.

To a host device (so-called personal computer) for managing various types of information, in general it is desirable to perform a recording or a reproducing operation by the sector unit or the block unit like the conventional floppy disks and hard disks. However, in the case of the above format, additional sectors, for example two sectors, are respectively required before and after the sectors in each recording operation. Therefore, it is necessary to transmit sectors corresponding to the additional sectors together. Besides, in case of rewriting information, it is necessary to manage both sectors which can be used as data areas and additional sectors which can not be used, thereby causing the management to be complicated.

In the case of a high volume of information such as digital and music information, large numbers of sectors are required for recording the information. Therefore, even in case additional sectors are not provided, only a minor problem occurs, i.e. the leading and ending parts of the information are slightly broken. Namely, in the case of the music information, the information is not affected much aurally. On the contrary, in the case of digital information or the like where small numbers of sectors are required for recording the information, generally additional sectors need to be provided. Thus, various problems arise as described above.

SUMMARY OF THE INVENTION

It is an object of the invention to record and reproduce information by specifying block numbers and to manage the information by specifying the addresses by the block unit, without providing additional sectors required for recording and reproduction in the non-complete interleaving method.

In order to achieve the object, an information recording and reproducing device of the present invention includes an operation device for calculating physical sector numbers based on a block number given to each block, and a recorder for recording information based on the physical sector numbers given by the calculation. Each block is composed of predetermined numbers of the effective sectors and dummy sectors respectively provided before and after the effective sectors.

According to the arrangement, a host device connected to the information recording and reproducing device can direct the information recording and reproducing device to perform a recording or a reproducing operation by only specifying the block numbers of blocks where information is to be recorded or reproduced. The information management of the information recording and reproducing device can be conducted easily as the host device specifies block addresses.

Another object of the present invention is to use a recording area effectively by classifying information into two groups: a group of information whose volume varies and a group of information whose volume is fixed, and by recording them successively.

In order to achieve the object, a information recording and reproducing device of the present invention includes a recording controller means for recording a group of information whose volume varies from the smallest block number toward the larger block numbers in order and for recording a group of information whose volume is fixed in the reversed order.

In this arrangement, when only the group of information whose volume varies is erased by the block, successive blank areas are present. Then, the group of information whose volume is fixed can be effectively recorded in the blank areas. Regarding information whose volume varies, only one blank area is presented between the group of information whose volume varies and the group of information whose volume is fixed. Consequently, the effective use of the recording area is realized.

Another object of the present invention is to record various types of information in blocks composed of the optimum numbers of sectors according to the respective data length by providing blocks composed of different numbers of sectors on a single recording medium.

In order to achieve the object, an information recording and reproducing device of the present invention employs a recording medium whereon units and a unit information recording area is provided. The units are collections of blocks composed of predetermined numbers of the sectors (the block is the minimum unit). The unit information recording area contains unit allocation information and sector number information indicating the number of sectors forming one block in each unit.

The system includes a device for determining physical sector numbers corresponding to the block in a unit which is specified when performing recording and reproducing operations based on the above-mentioned respective information read out at the time the recording medium is loaded.

According to the arrangement, various types of information can be recorded in appropriate blocks on a recording medium according to the data length of the respective information. As a result, the recording area of the recording medium can be used effectively, permitting the average recording and reproducing speed to increase.

Additionally, the file management may be carried out by providing a unit wherein file management information is recorded separately from a unit wherein the files are recorded.

Another object of the present invention is to improve the utility factor of a recording medium when recording high-volume information in a number of blocks, by adding predetermined numbers of the front and rear additional data only to the first and last blocks.

In order to achieve the object, an information recording and reproducing system of the present invention includes a device for providing dummy sectors before and after each block when recording low-volume data and for adding predetermined numbers of the front and rear additional data only to the first and last blocks when recording high-volume data, wherein the block is composed of predetermined numbers of the effective sectors and dummy sectors provided before and after the group of effective sectors.

According to the arrangement, since additional data is added according to the volume of each data during recording operations, the utility factor of the recording medium can improve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein:

FIGS. 1 to FIG. 16 show an embodiment of the present

FIG. 2, items (a)–(d) are time charts illustrating the flow of information when recording low-volume information.

FIG. 3, items (a)–(d) are time charts illustrating the flow of information when recording high-volume information.

FIG. 4 is a block diagram illustrating an information recording and reproducing device.

FIG. 5 is a schematic plane view illustrating a magneto-optical disk.

FIG. 6 is an enlarged plane view illustrating the magneto-optical disk.

FIG. 7 is a block diagram of the information recording and reproducing device for recording information from an external device.

FIG. 8(a) is an explanatory view illustrating the allocation of image and voice information concerned with the information recording and reproducing device.

FIG. 8(b) is an explanatory view illustrating the allocation of the information when music information is rewritten.

FIG. 9 is an explanatory view illustrating block and sector structures when recording image information.

FIG. 10, items (a)–(d) are time charts illustrating the flow of information when recording image information.

FIG. 11 is another explanatory view illustrating block and sector structures when recording image information.

FIG. 12 is an explanatory view illustrating the block and sector structures when recording voice information.

FIG. 13 is a schematic view illustrating an area allocation of the magneto-optical disk.

FIG. 14 is a typical depiction illustrating the relationship between physical sector numbers, block numbers and track numbers.

FIG. 15 is a block diagram of another information recording and reproducing device.

FIG. 16 is a time chart of a case where recording operations and reproduction operations for verification are repeatedly performed by the block unit.

FIG. 17 is a schematic plane view illustrating a compact disk.

FIG. 18 is a typical depiction illustrating a frame signal format of the compact disk.

FIG. 19 is a typical depiction illustrating a sector format of the compact disk.

FIG. 20 and FIG. 21 are explanatory views respectively illustrating an allocation of image information and voice information concerned with a conventional electronic still camera.

FIG. 22 is a time chart of a case where recording operations and reproducing operations for verification are repeatedly performed by the block unit.

DESCRIPTION OF THE EMBODIMENTS

Referring to FIG. 1 to FIG. 6, one embodiment of the present invention is described below.

Figure 5:
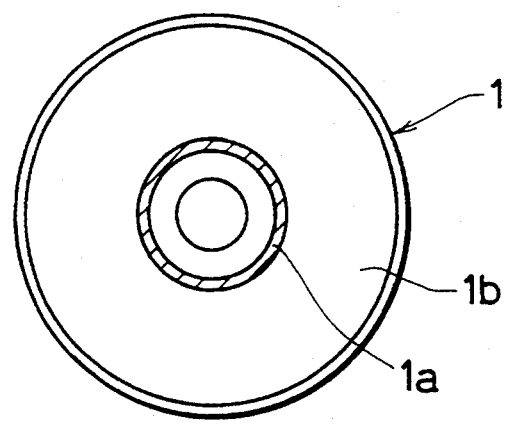

As shown in FIG. 5, a rewritable magneto-optical disk 1 as a recordable recording medium is provided with a TOC area 1a located in the vicinity of the inner edge of the magneto-optical disk 1 and an information recording area 1b occupying most areas outside the TOC area 1a. In the information recording area 1b, various types of information such as music, text and image information and coded data are recorded, while in the TOC area 1a, additional information relating to the respective information recorded in the information recording area 1b, for example the positions of the first and last sectors of the respective information, is recorded.

Figure 6:
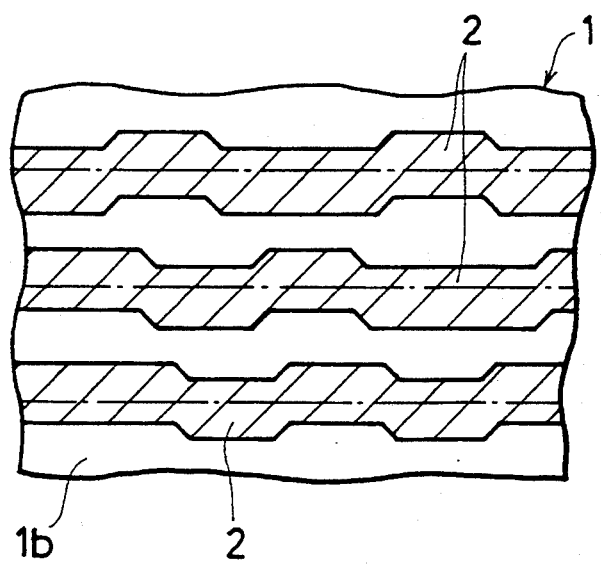

As shown in FIG. 6, on the TOC area 1a and the information recording area 1b of the magneto-optical disk 1, guiding grooves 2 in the form of a spiral (shown by hatching) are formed beforehand, leaving a predetermined space between the grooves in a radial direction of the disk. Absolute addresses (addresses) are recorded on the magneto-optical disk 1 by deviating the guiding grooves 2 outward or inward in the radial direction of the disk according to "0" or "1" (binary logic) of the respective bits of the absolute addresses having gone through a bi-phase mark modulation process. The absolute addresses indicate locations on the disk and are used as rotation control information in operations such as CLV control. Since the absolute addresses of the present embodiment are equivalent to sectors in the CD format, they are referred to as physical sector numbers hereinafter.

Figure 4:
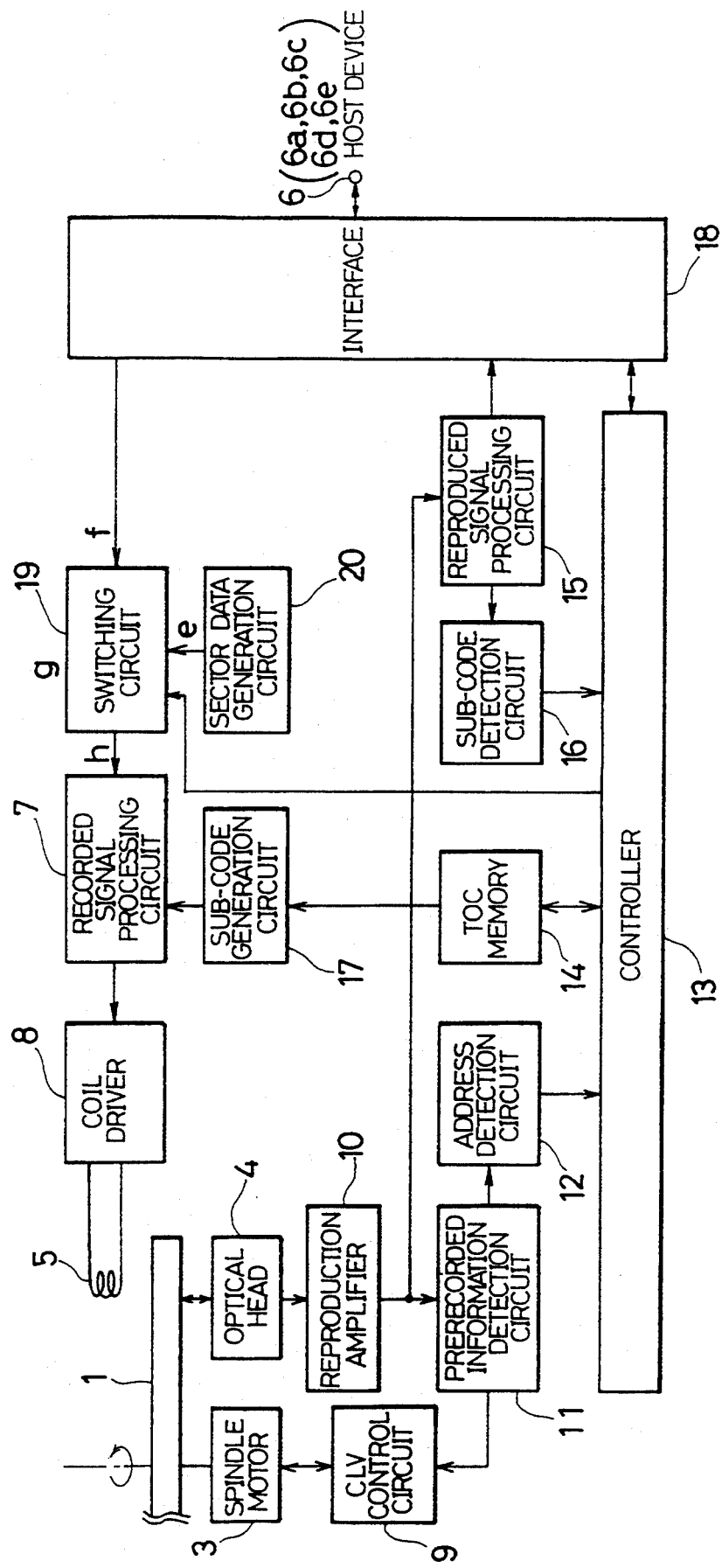

An information recording and reproducing device of the present invention, shown in the block diagram of FIG. 4, comprises a spindle motor 3 for supporting and rotating the magneto-optical disk 1, an optical head 4 for irradiating laser light on the magneto-optical disk 1 during recording and reproduction, and a coil 5 for applying a magnetic field onto the magneto-optical disk 1 during recording. As will be described later, recording means composed of the optical head 4 and the coil 5 performs recording operations in its first mode or second mode, based on the control of a controller 13.

The information recording and reproducing device of the present embodiment is configured so as to perform recording operations in the so-called magnetic field modulation method and overwriting operations for recording new information over formerly recorded information (erasing operations are not required). The information recording and reproducing device has a terminal 6 to which instructions to perform recording/reproducing operations are input from a host device (not shown) such as a so-called personal computer, and data such as text and image information is input from the host device, or from which data is transmitted to the host device. When recording information, the information from the host device through the terminal 6 is sent to a switching circuit 19 from an interface 18 as digital data f.

Into the switching circuit 19, the digital data f from the interface 18 and additional data e from a sector data generation circuit 20 are input. The controller 13 gives instructions to perform switching operation to the switching circuit 19 upon receiving instructions to record information or the like from the host device through the terminal 6 and the interface 18. In response to the instructions, the switching circuit 19 selects either the data e or data f and sends it to the recorded signal processing circuit 7 as digital data h.

The host device is a device which can give instructions to execute recording and reproducing operations or other operations to the present recording and reproducing device.

Figure 18:
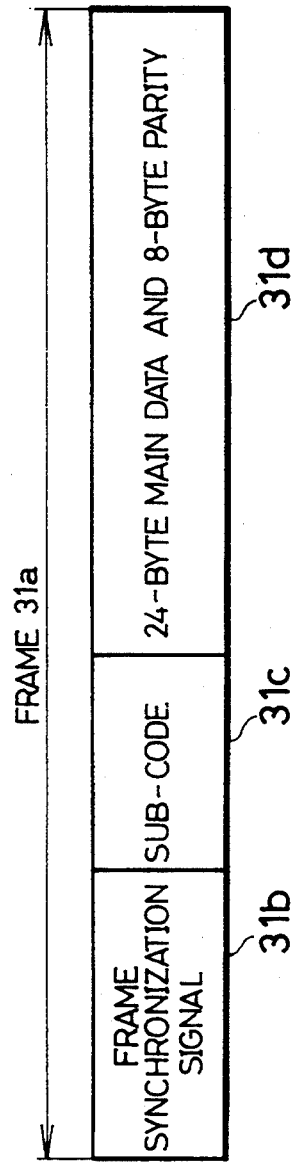
Figure 19:
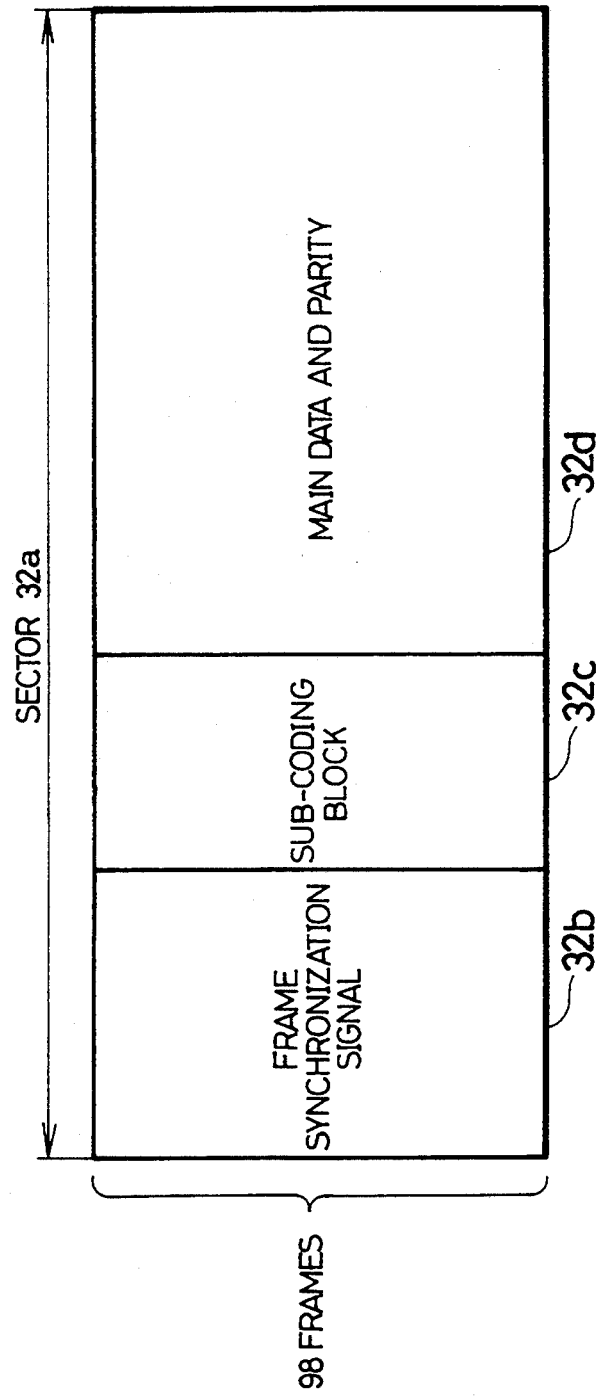
Figure 20:
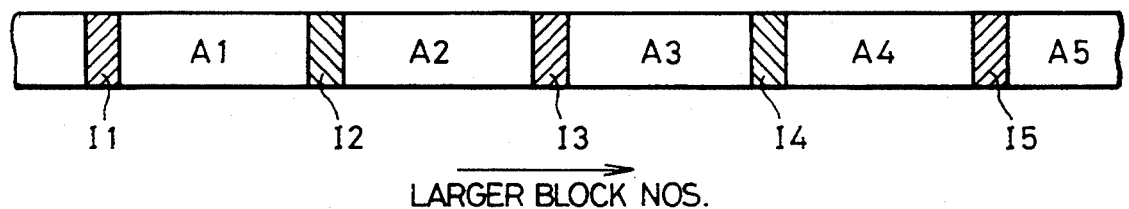
Figure 21:
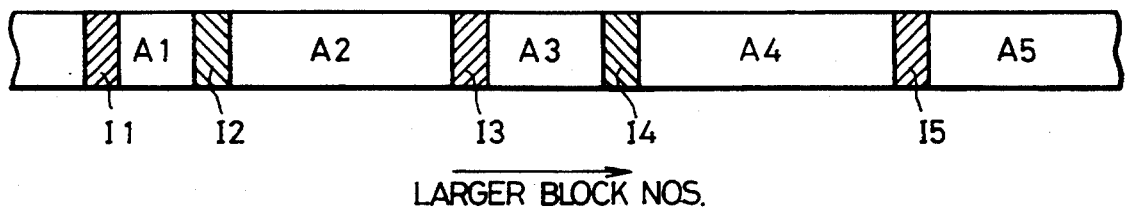
Figure 22:
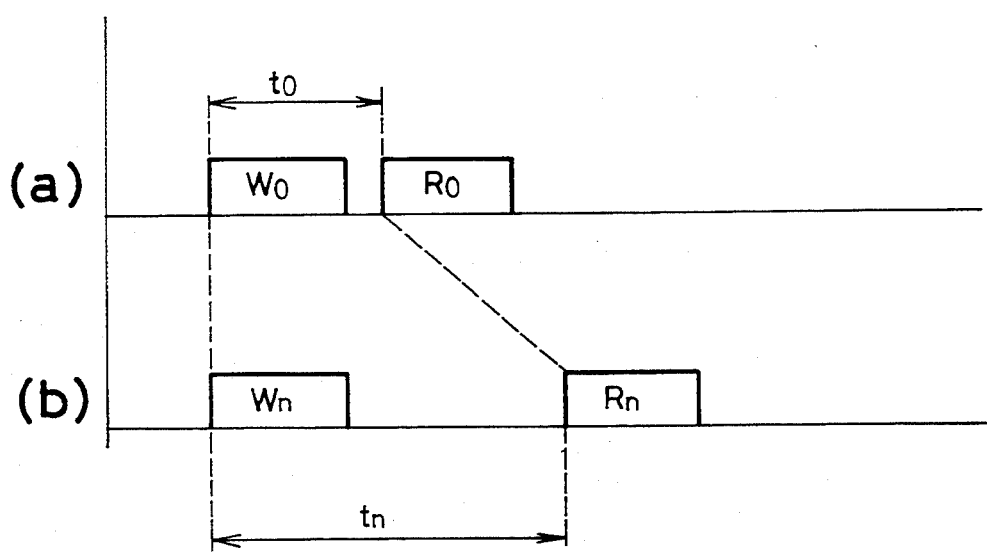

In the recorded signal processing circuit 7, error detection and correction parity is generated, and the parity and sub-code information from a sub-code generation circuit 17 are added to the digital data h. Next, the digital data h is modulated based on the EFM process. Then a frame synchronization signal is added thereto, and the resulting signal is supplied to a coil driver 8. The coil driver 8 drives the coil 5 according to the supplied signal, and simultaneously the optical head 4 irradiates laser light on the magneto-optical disk 1 so as to record the signal. Regarding the format of the signal, for example, the signal format shown in FIG. 18 and FIG. 19 as a conventional example may be used.

In the mean time, in a reproduction operation, a signal reproduced by the optical head 4 is amplified by a reproduction amplifier 10 and is then sent to a prerecorded information detection circuit 11 and a reproduced signal processing circuit 15. The prerecorded signal detection circuit 11 is composed, for example, of a band-pass filter and a PLL (Phase Locked Loop). A clock signal in synchronization with prerecorded information extracted from the reproduced signal by the band-pass filter is generated by the PLL. A clock signal in synchronization with the prerecorded information composed of the bi-phase mark modulated signal of an absolute address is supplied to a CLV control circuit 9.

The CLV control circuit 9 compares the frequency of the above synchronous clock from the prerecorded information detection circuit 11 with the reference frequency generated therein, and the resulting differential signal controls the rotation of the spindle motor 3, realizing the accurate CLV control. The prerecorded information extracted from the reproduced signal by the prerecorded signal information detection circuit 11 is supplied to an address detection circuit 12.

The address detection circuit 12 comprises, for example, a bi-phase mark demodulation circuit and an address decoder. The prerecorded information extracted by the prerecorded information detection circuit 11 is demodulated by the bi-phase mark demodulation circuit, and decoded into an address on the disk, i.e. into a physical sector number, by the address decoder, and then the physical sector number is supplied to the controller 13.

The magneto-optical signal component of the reproduced signal supplied from the reproduction amplifier 10 goes through an EFM demodulation process in the reproduced signal processing circuit 15, and then goes through an error detection and correction process using error detection and correction parity. Then, signal data having gone through a reproduction process is output to the host device from the terminal 6 through the interface 18.

After going through the EFM demodulation process in the reproduced signal processing circuit 15, the sub-code information is supplied to a sub-code detection circuit 16. The sub-code information recognized by the sub-code detection circuit 16 is sent to the controller 13. The controller 13 receives instructions to perform recording/reproducing operations from the host device through the terminal 6 and the interface 18. The controller 13 has an access function; it recognizes the position of the optical head 4 on the magneto-optical disk 1 and moves the optical head 4 and the coil 5 to a target position by the use of a shifting means (not shown) on receiving the physical sector number from the address detection circuit 12.

Further, by the controller 13, the sub-code information released from the sub-code detection circuit 16 is picked out and recorded in the TOC memory 14, information and the like which are related to the contents of the TOC and released from the host device through the interface 18 are recorded in the TOC memory 14, or the contents of the TOC memory 14 are read out.

The sub-code information stored in the TOC memory 14 is supplied to the sub-code generation circuit 17 where sub-codes are generated, as needed. The sub-codes go through the EFM process in the recorded signal processing circuit 7 and are then supplied to the coil driver 8. With the above process, the sub-code information in the TOC memory 14 is recorded in the TOC area 1a of the magneto-optical disk 1.

Figure 1A:
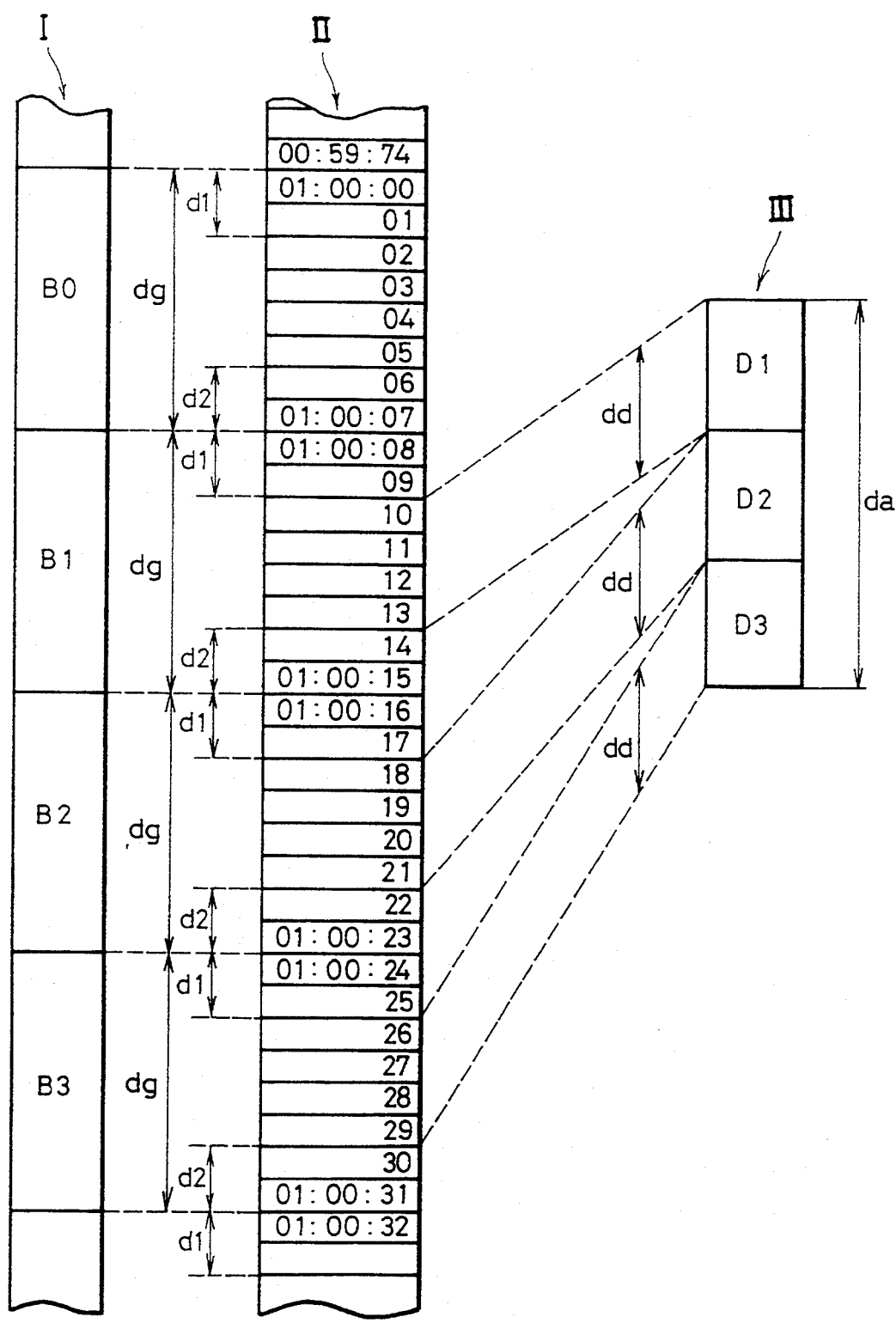
FIG. 1(a) is an explanatory view illustrating the relationship between block numbers, physical sector numbers and recording information when recording low-volume information.

FIG. 1(a) is a typical depiction showing an information allocation in a case where low-volume information da, i.e. comparatively a low volume of information, for example text information or management information such as a directory, which is appropriate to perform recording and reproducing operations by the block unit, is recorded on the magneto-optical disk 1 in the first mode of the present invention. I of FIG. 1(a) shows the block structure and II shows the sector structure of each block. As shown by I of the figure, block numbers B0, B1, B2 . . . are given to the respective blocks, and as shown by II of the figure physical sector numbers are given to each sector belonging to the block. The physical sector numbers are indicated as a function of time "minute":"second":"a sector number in one second" (a value from 0 to 74 as there are 75 sectors in one second in this embodiment). Data dg of each block is composed of eight sectors, for example physical sector number (01:00:00) is given to the first sector of block No. B0.

When recording information, in response to instructions to record information in a specified range of blocks given by the host device through the interface 18, the controller 13 calculates physical sector numbers corresponding to the range of blocks. Referring to FIG. 1(a), the above operation is explained more precisely below.

For example, when the host device gives instructions to record information in blocks No. B1 to No. B3, the number of sectors per block is determined "eight sectors" and the first physical sector number of block No. B0 is determined (01:00:00) beforehand as described above. Therefore, the first physical sector number of block No. B0 where the recording operation starts is given by the equation:

(01:00:00)+block No. (1)×the number of sectors (8)=(01:00:08)

Thus, the first physical sector number of block No. B1 can be easily obtained by the calculation.

When the physical sector numbers of block No. B1 are obtained, operations such as access to corresponding blocks are performed. Namely, the following operation is performed to block No. B1 shown in FIG. 2(a), i.e. additional data e (shown in FIG. 2(b)) and digital data f are consecutively switched by the switching circuit 19, which allows desired information to be recorded. The additional data e is composed of $n_1$ pieces of data (here, front additional data d1 to be recorded in two front additional sectors shown in FIG. 2(d)) given by the sector data generation circuit 20 and $n_2$ pieces of data (here, rear addition data d2 to be recorded in two rear additional sectors). The digital data f is composed of divided data D1 (shown in FIG. 2(c)) which is obtained by dividing low-volume information da such as text information given from the host device through the interface 18 by the size of four sectors corresponding to effective sectors dd (FIG. 1(a)).

The following explains again the process of recording information in block No. B1.

Figure 2:
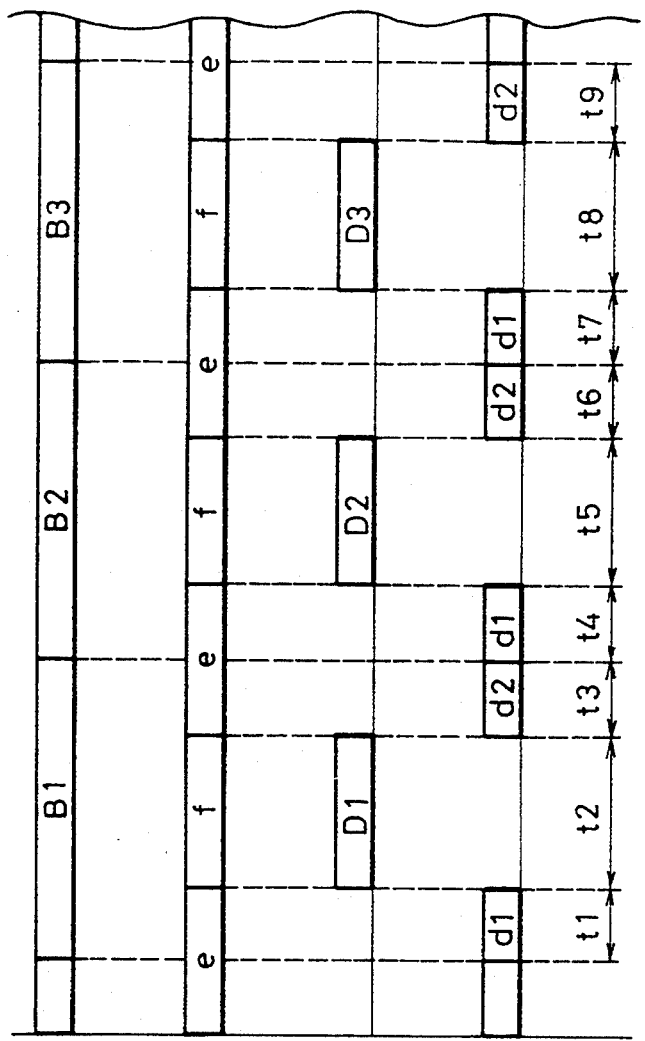

First, front additional data d1 to be recorded in two sectors, sector No. (01:00:08) and the following sector, is given by the sector data generation circuit 20 and is supplied to the recorded signal processing circuit 7 through the switching circuit 19, and is then recorded in the information recording area 1b of the magneto-optical disk 1 (see period t1 in FIG. 2).

Next, physical sector No. (01:00:10) and the following three sectors which are equivalent to the size of the effective sectors dd are provided for the divided data D1 of the low-volume information da such as text information given from the host device through the interface 18, and the data is supplied to the recorded signal processing circuit 7 through the switching circuit 19 and is then recorded (see period t2 in FIG. 2).

Then, rear additional data d2 corresponding to two sectors, i.e. physical sector No. (01:00:14) and the following sector, is given from the sector data generation circuit 20, and the data is supplied to the recorded signal processing circuit 7 through the switching circuit 19 and are then recorded (see period t3 of FIG. 2).

In the above process, a recording operation to one block is completed and thereafter data is successively recorded in blocks No. B2 and No. B3 through the respective process shown in periods t4 to t9 of FIG. 2.

As described above, by only specifying a block number, the host device such as personal computer directs the information recording and reproducing device to perform the recording operation of the low-volume information da by adding the additional data e. Besides, information recorded in blocks can be rewritten respectively by the block unit.

For the area management of the recorded low-volume information da, the host device may allocate predetermined numbers of the blocks for the area management information as the low-volume information da, and the information may be recorded in the same process as above. The data may also be recorded in the blocks after going through the following process: i) going through the controller 13 and the TOC memory 14; ii) being converted into a predetermined format in the sub-code generation circuit 17; and iii) being supplied to the recorded signal processing circuit 7. In the latter process, the area management information is normally recorded in the TOC area 1a.

Figure 1B:
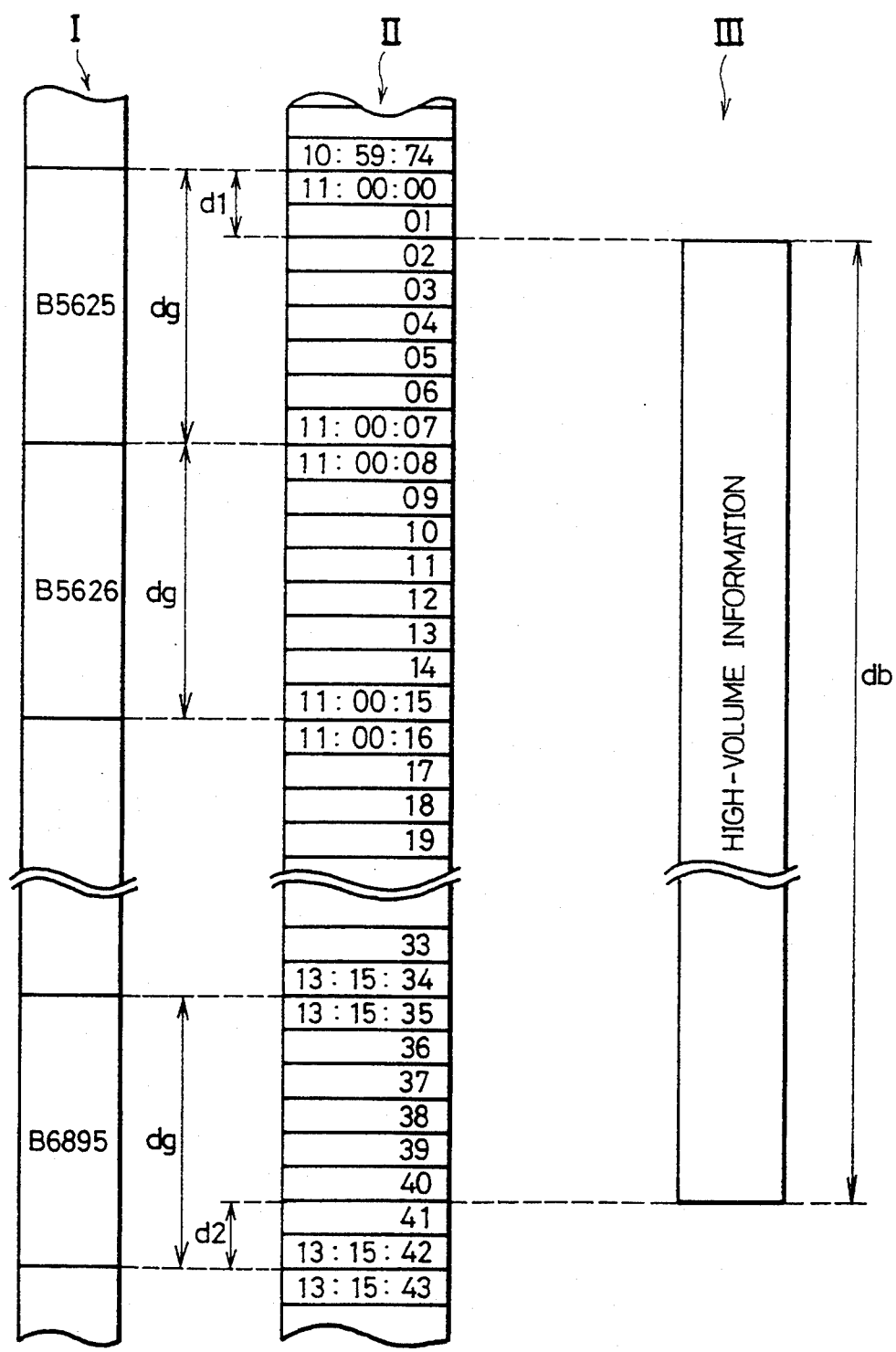
FIG. 1(b) is an explanatory view illustrating the relationship between block numbers, physical sector numbers and recording information when recording high-volume information.

Next, referring to FIG. 1(b) a process for recording information db whose volume is normally quite high such as still image information in the second mode of the present invention will be discussed. I in FIG. 1(b) shows the block structure, II the sector structure, and data dg in a single block is composed of eight sectors like the above case. III shows the high-volume information db to be recorded.

The controller 13 first, in response to instructions to record information in specified blocks given by the host device through the interface 18, converts the block numbers into actual physical sector numbers. The following explains the operation more concretely by referring to FIG. 1(b).

For example, when the host device gives instructions to record information in beginning block No. B5625, since it is determined in advance that the number of sector per block is eight sectors and the physical sector number of the first sector of block No. B0 is (01:00:00), the physical sector number of the first sector of block No. 5625 is given by the following equation.

$$(01:00:00) + \text{block No. } (5625) \times \text{the number of sector}$$
$$(8) = (01:00:00) + 45000 = (11:00:00)$$

Thus, the physical sector number of the first sector of block No. B5625 can be easily given by the calculation.

Figure 3:
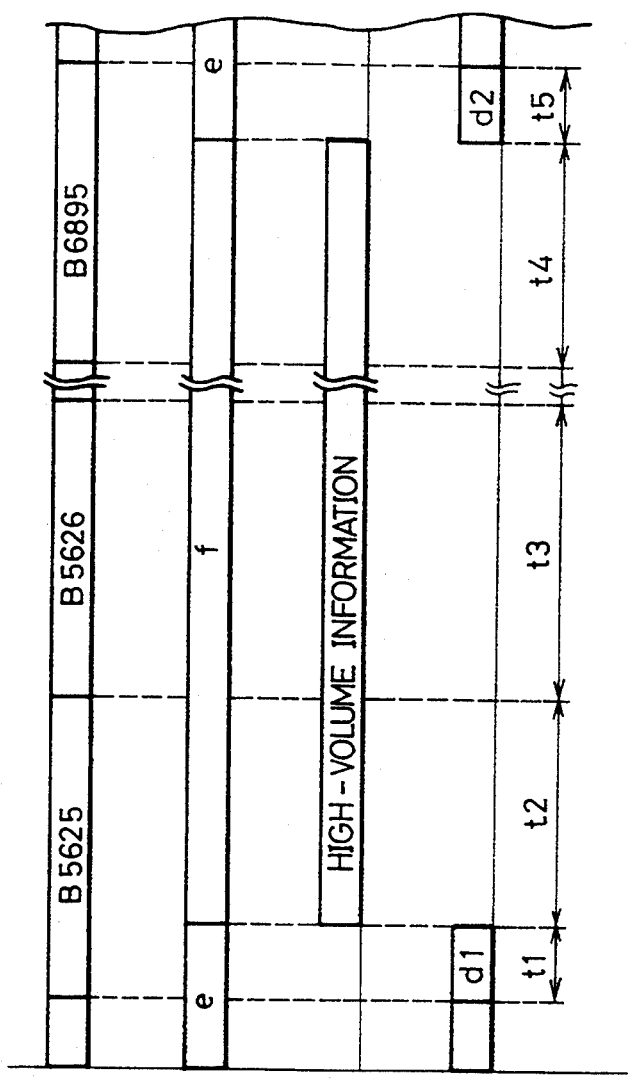

After performing a necessary access operation to physical sector No. (11:00:00) thus obtained (shown in FIG. 3(a)), the switching circuit 19 is switched to the sector data generation circuit 20 side (see FIG. 3(b)) and additional data e supplied from the sector data generation circuit 20 is sent to the recorded signal processing circuit 7 as digital data h. With the operation, front additional data d1 (shown in FIG. 3(d)) is recorded in the first two sectors of block No. B5625 (see period t1 of FIG. 3).

Next, the switching circuit 19 is switched to the interface 18 side, and then the host device sends high-volume information db supplied as digital data f to the recorded signal processing circuit 7 as digital data h through the terminal 6 and the interface 18. With the operation, the high-volume information db (FIG. 3(c)) such as still image information is recorded in the rest of the sectors of block No. B5625 (see period t2 of FIG. 3).

Then, the high-volume information db is successively recorded in block No. B5626 and the following blocks (see period t3 of FIG. 3), and the recording is continued, for example to block No. B6895 depending on the data length (see period t4 of FIG. 3).

When the recording of the high-volume information db is completed, the switching circuit 19 is switched to the sector data generation circuit 20 side, and then for example, rear additional data d2 is recorded in the last two sectors of block No. B6895 (see period t5 of FIG. 3). In this case, since the recording of the high-volume information db is completed at the sixth sector of the last block, the rear additional data d2 is recorded in the last two sectors of the block. Even when the recording of the high-volume information da is completed at the fifth sector of the block or before, no problem occurs if the rear additional data d2 is recorded right after the data da.

Upon receiving instructions from the host device, the controller 13 sends the instructions to the sub-code generation circuit 17 through the TOC memory 14. In the sub-code generation circuit 17, input data is converted into a predetermined format and is supplied to the recorded signal processing circuit 7, and is then recorded as area management information. Based on the area management information, the area management of the high-volume information db recorded in the above-mentioned way is achieved. In this case, the area management information is recorded in the TOC area 1a.

The reproduction of the low-volume information da and the high-volume information db thus recorded are performed through the following process. i) The host device sends instructions to perform a reproducing operation and the block numbers of areas to be reproduced to the controller 13 through the interface 18. ii) The block numbers are converted into physical sector numbers like the recording process. iii) The reproduction is executed by performing necessary access operations.

If information to be reproduced is the low-volume information da, according to FIG. 1(a), a signal reproduced by the optical head 4 is amplified by the reproduction amplifier 10, and the magneto-optical component of the reproduced signal goes through an EFM modulation process in the reproduced signal processing circuit 15 and then an error detection and correction process using error detection and correction parity. In the error detection and correction process, the reproduction of effective sectors dd is performed by using additional data e composed of front additional data d1 recorded in the front additional sectors and rear additional data d2 recorded in the rear additional sectors of FIG. 1(a). Only divided data D1, D2 . . . of signal data reproduced which were respectively recorded in four sectors corresponding to the effective sectors dd, are sent to the host device by the block unit through the interface 18.

If information to be reproduced is high-volume information db, according to FIG. 1(b), a signal read by the optical head 4 is amplified by the reproduction amplifier 10, the magneto-optical signal component of the reproduced signal goes through the EFM process in the reproduced signal processing circuit 15, and goes through the error detection and correction process using error detection and correction parity, and is then sent to the host device through the interface 18 and the terminal 6. In this case, since additional front data d1 and additional rear data d2 are respectively added before and after the high-volume information db, even if errors occur in the leading and ending parts of the high-volume information db, the detection and correction can be performed accurately.

As describe above, when recording the comparatively low-volume information da, since the information is recorded in the first mode, i.e. by adding front additional data d1 and rear additional data d2 to every block, the information can be rewritten by the block unit, thereby permitting the management of information to be easier. Moreover, in this case, the low-volume information da can be recorded in a single block or a small number of blocks. Therefore, even if front additional data d1 and rear additional data d2 are added to the respective blocks, a decrease in the utility factor of the recording area of the magneto-optical disk 1 does not cause a serious problem and a good transfer ratio of data is obtained.

In the mean time, when recording the comparatively high-volume information db, since the information is recorded in the second mode, i.e. by adding front additional data d1 and rear additional data d2 only to the first and last blocks, the utility factor of the magneto-optical disk 1 and the transfer ratio of data can improve. In this case, if the data length of the respective high-volume information db is fixed and if new high-volume information db is rewritten in blocks wherein other high-volume information db used to be recorded during a rewriting operation, the address management is maintained easily during the rewriting operation. Thus, the second mode is appropriate for the high-volume information db whose data length is fixed. Information having different data length may also be recorded in the first mode even if it is comparatively a high volume of information.

When recording information in the magneto-optical disk 1 so as to create a backup copy of the information which is to be recorded in another recording medium by the use of the present information recording and reproducing device, the frequency of rewriting the information is low as it is a backup copy. Therefore, it is desirable to record the information in the magneto-optical disk 1 in the second mode, permitting a higher utility factor of the recording area.

Before starting the recording of information in the magneto-optical disk 1, the host device gives data, such as areas to be used in the first mode and in the second mode respectively and the number of sectors per block, and the data can be registered in a predetermined area of the magneto-optical disk 1. Instead of allocating areas on the magneto-optical disk 1 for each mode separately, by giving identification codes to the information to distinguish the respective modes used, the information recorded in the first mode and the information recorded in the second mode can be mixed up on the magneto-optical disk 1.

In this embodiment a single block was composed of eight sectors, however the numerical value was just taken for convenience' sake. Therefore, the size of the block can be changed as needed.

For absolute addresses, if they are prerecorded and distinguishable, they can be recorded in any form, for example in the form of pits.

In the above embodiment a disc-shaped recording medium of magneto-optical type was used, however, a write once recording medium which allows one writing action and, needless to say, rewritable recording media of other types can be used. Regarding the write once recording medium, for example TeOx, TeC, and an organic pigment film are listed. The shape of the recording medium is not limited to disc which was described in the above embodiment, so tape type and card type recording media can also be used if they do not depart from the scope of the present invention.

As described above, the information recording and reproducing device of the present invention comprises recording means for performing the recording operations of information either in the first mode or the second mode. In the first mode, one block is composed of $(n+n_1+n_2)$ numbers of sectors which are formed by providing $n_1$ numbers of front additional sectors in front of each n numbers of effective sector and $n_2$ numbers of rear additional sectors behind thereof, and the recording operation of information to be recorded is performed by the block unit. More precisely, the information is divided by the n numbers of effective sector unit, and the information is recorded in the effective sectors of each block by generating and adding front additional data and rear additional data to the respective front and rear additional sectors. In the second mode, the information is successively recorded over blocks which are respectively formed of $(n+n_1+n_2)$ numbers of sectors by adding front additional data only to the $n_1$ numbers of front sectors of the first block and adding rear additional data only to the $n_2$ numbers of rear sectors of the last block.

Therefore, if the volume of information to be recorded is quite low such as text information, the information can be recorded within a single sector or a quite a small number of sectors by performing the recording operation in the first mode. Especially, when the information is recorded in a rewritable type recording medium, it is possible to rewrite it easily by the block unit. In this case, reproduction errors can be detected and corrected by adding front additional data and rear additional data to each block, and a decrease in the utility factor of the rewritable type recording medium caused by the addition of the additional data to the blocks is not a serious problem as the data volume is comparatively low.

On the contrary, if the volume of data to be recorded is high, i.e. the data is recorded in a number of blocks, by adding predetermined numbers of the front additional data and rear additional data only to the first and last blocks, specified information is successively recorded in other blocks due to the recording operation in the second mode, thereby permitting the utility factor of the recordable type recording medium to improve when recording high-volume data. In this case, the additional data is not recorded in blocks other than the first and last blocks. However, since the connection for error correction is successively given between the respective blocks by the non-complete interleaving method, reproduction errors are certainly detected and corrected.

The second mode is especially appropriate for data whose volume is comparatively high and whose data length is fixed, such as still image data. Particularly, when high-volume data whose data length is fixed is recorded on a rewritable type recording medium in the second mode, by writing new information in a group of blocks, wherein the former data such as still image data is recorded, to replace the formerly recorded data during the rewriting operation, the address management can be carried out easily during the rewriting of high-volume information. Data whose volume is quite high and whose data length is not fixed can be recorded in the first mode.

The following explains an information recording and reproducing device for recording and reproducing external information (discrete information or successive information).

For members having the same functions as the members in the above embodiment, the same reference numbers are given to them, and the detailed explanations are omitted here.

Figure 7:
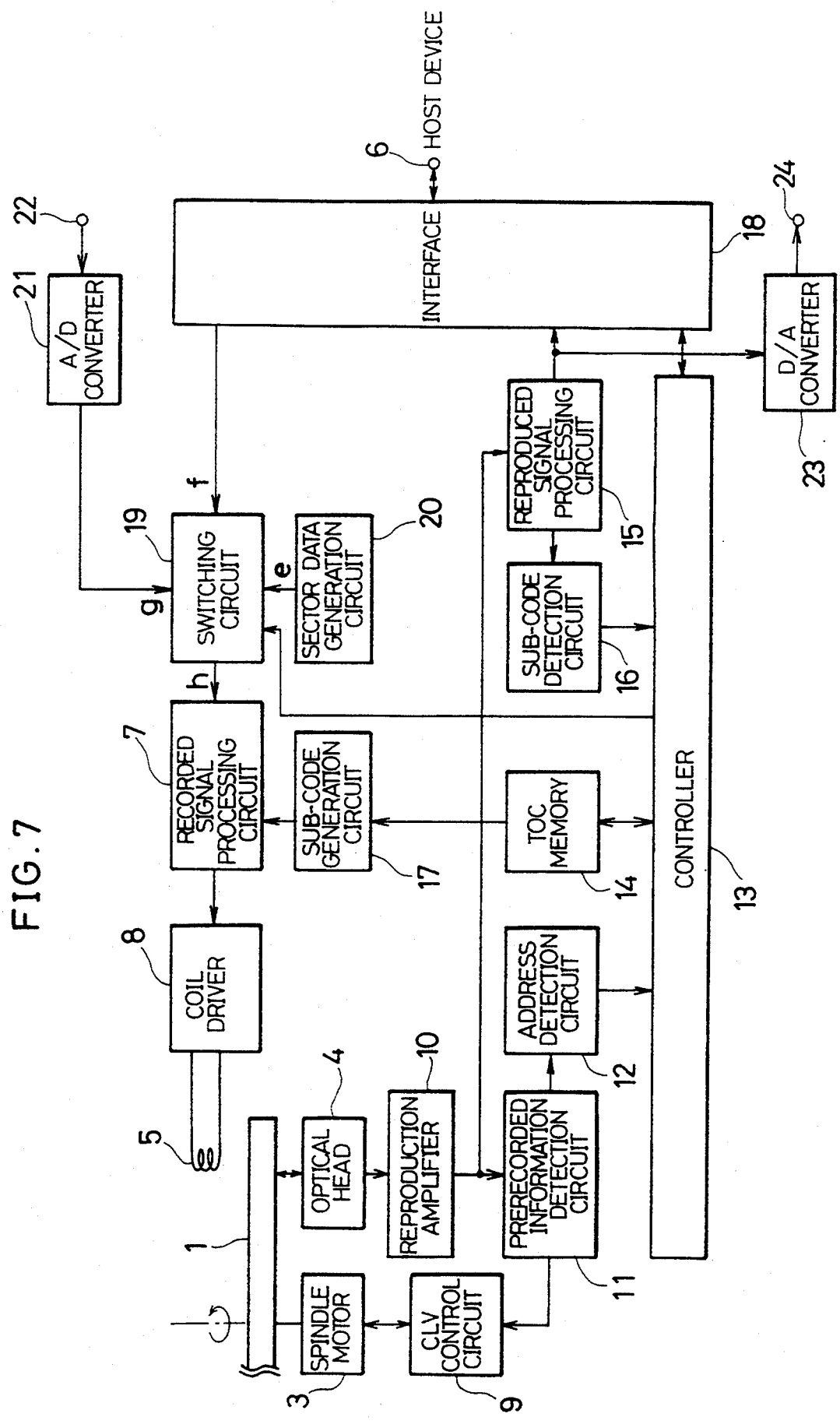

As shown in FIG. 7, an information recording and reproducing device of this embodiment is configured so as to perform recording operations in the so-called magnetic field modulation method and to perform overwriting operations for recording new information over formerly recorded information (erasing operations are unnecessary).

The information recording and reproducing device of this embodiment, comprises an input terminal 22 to which analog signals of, for example, music information to be recorded are input from an external audio device or the like, and an analog/digital (A/D) converter 21 for converting analog signals into digital signals. The information recording and reproducing device also comprises a digital/analog (D/A) converter 23 for converting reproduced signals which are digital signals into analog signals and an output terminal 24. The difference between this embodiment and the above embodiment (see FIG. 4) is the members described here.

The information recording and reproducing device receives instructions to perform recording and reproducing operations from a host device such as personal computer. Data such as text and image information are input/output between the information recording and reproducing device and the host device through a terminal 6. Data and analog signals of, for example, music information to be recorded is input to the information recording and reproducing device from the external audio device or the like through the input terminal 22.

For example, when recording successive information db such as music information, analog signals entered from the input terminal 22 are converted into digital data g by the A/D converter 21 and then sent to a switching circuit 19. The data is supplied to a recorded signal processing circuit 7 as digital data h, and then goes through the same recording process as the above embodiment.

On the other hand, when recording discrete information da such as text information, the discrete information da entered from the host device through the terminal 6 is supplied to the switching circuit 19 as digital data f through the interface 18, and digital data h to which additional data e is appropriately added from the sector data generation circuit 20 is supplied to the recorded signal processing circuit 7. Then the recording process is executed in the same way as the above embodiment.

The discrete information or successive information recorded in the above manner is reproduced by an optical head 4 and amplified by a reproduction amplifier 10, and is then sent to a prerecorded signal detection circuit 11 and a reproduced signal processing circuit 15. Then the reproduction process is executed in the same way as the above embodiment. When signal data reproduced is music information or the like, the signal data is output to an external audio device or the like as analog music information through the D/A converter 23 and the output terminal 24.

When recording discrete information such as text information in a magneto-optical disk 1 by the use of the information recording and reproducing device of the present invention, a controller 13 as operation means, in response to instructions to record the information in a predetermined range of blocks given by the host device through the interface 18, calculates actual physical sector numbers corresponding to the range of blocks like the above embodiment.

When the physical sector numbers corresponding to the range of blocks are calculated, access operations to the target blocks are performed. Desired information is recorded in the blocks by switching additional data e composed of front additional data d1 and rear additional data d2 given by the sector data generation circuit 20 and digital data f composed of divided data which are obtained by dividing the discrete information da given from the host device through the interface 18 by the number of sectors corresponding to the number of effective sectors (see FIG. 2).

Into the switching circuit 19, the digital data g from the A/D converter 21, the discrete digital data f from the interface 18 and the additional data e from the sector data generation circuit 20 are input. The controller 13 gives instructions to perform switching operation to the switching circuit 19 upon receiving instructions to record music information, computer data or the like from the host device through the terminal 6 and the interface 18. In response to the instructions, the switching circuit 19 selects one of the data e, data f and data g, and sends it as digital data h.

In the mean time, regarding successive information db such as music information, access operations to the physical sector numbers thus obtained are performed, music information or the like in the form of analog signals from the input terminal 22 is converted into digital data g by the A/D converter 21, and is then supplied to the recorded signal processing circuit 7 through the switching circuit 19. Through the process, desired music information or the like is successively recorded in physical sector number (11:00:00) corresponding to the first sector of, for example, block No. B5625 and the following sector numbers (see FIG. 1(c)).

When the host device gives-instructions to end the recording operation to the controller 13 through the terminal 6 and the interface 18, the recording of the music information or the like is ended. According to FIG. 1(c), the recording of the music information or the like is finished at block No. B6895.

For area management of the successive information db thus recorded, the area management information goes through the controller 13 and the TOC memory 14 and is converted into a predetermined format by a sub-code generation circuit 17. Then, it is supplied to the recorded signal processing circuit 7 and recorded. In this case, the area management information is recorded in the TOC area 1a serving as a recording area.

The reproduction of the discrete information da and the successive information db thus recorded, is performed through the following process. First, the host device sends instructions to execute reproducing operation and the block numbers of areas to be reproduced to the controller 13 through the interface 18. Next, the block numbers are converted into physical sector numbers in the same manner as above. Then necessary access operations are performed.

When information to be reproduced is the discrete information da, according to FIG. 1(a), reproduced signals from the optical head 4 are amplified by the reproduction amplifier 10, the magneto-optical component of the reproduced signals goes through the EFM process in the reproduced signal processing circuit 15 and goes through an error detection and correction process using error detection and correction parity. In the error detection and correction process, the reproduction of effective sectors dd is executed by using additional data e composed of front additional data d1 recorded in the front additional sectors and rear additional data d2 recorded in the rear additional sectors of FIG. 1(a). Only divided data D1, D2 . . . of the reproduced signal data which were recorded in four sectors corresponding to the effective sectors dd, are sent to the host device through the interface 18 in each block.

Figure 1C:
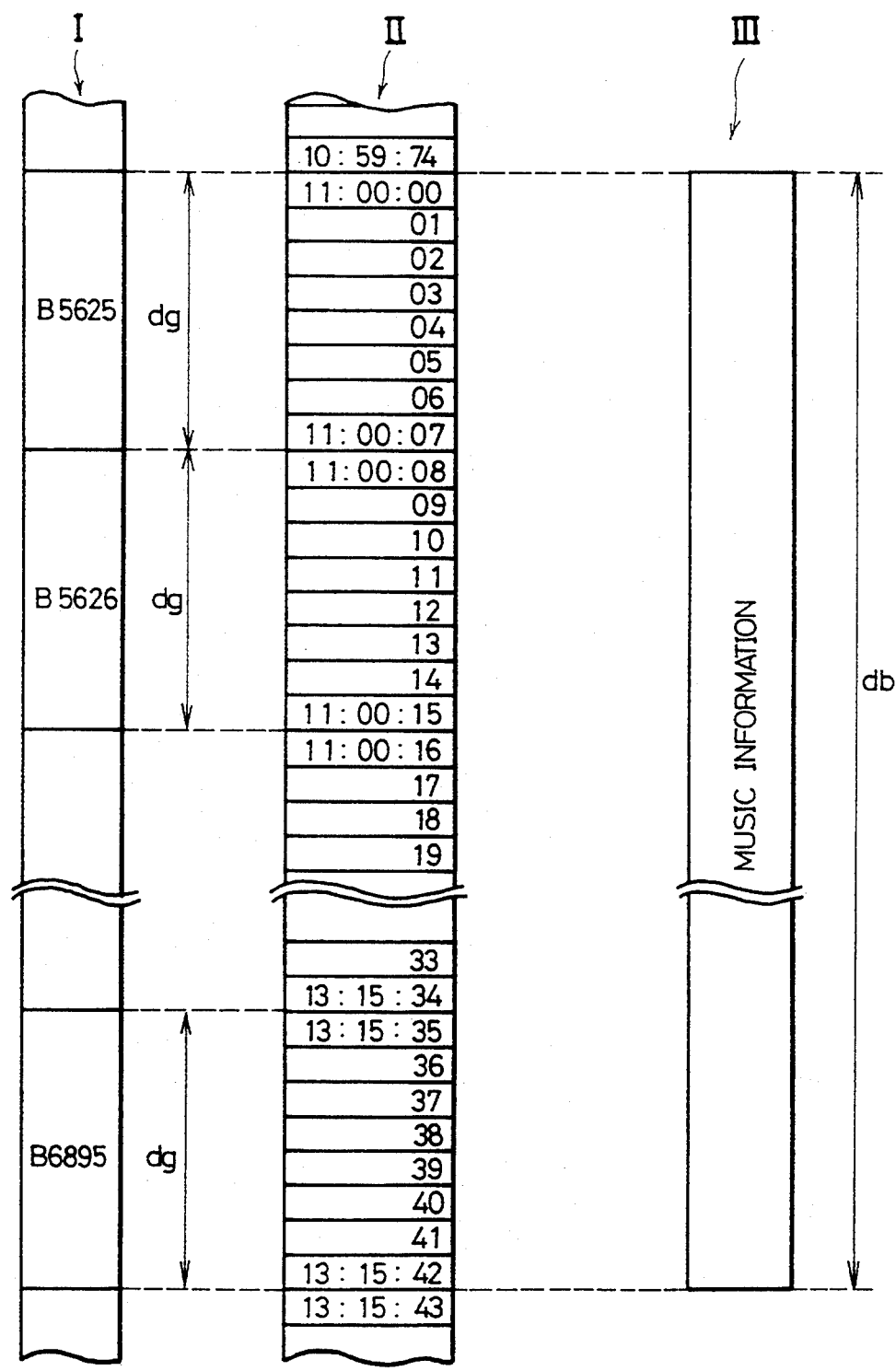
FIG. 1(c) is an explanatory view illustrating the relationship between block numbers, physical sector numbers and recording information when recording successive information.

When information to be reproduced is the successive information db, according to FIG. 1(c), reproduced signals from the optical head 4 are amplified by the reproduction amplifier 10, the magneto-optical component of the reproduced signals goes through the EFM process in the reproduced signal processing circuit 15, goes through the error detection and correction process using error detection and correction parity, and is then released as analog music information or the like through the D/A converter 23 and the output terminal 24.

Accordingly, it is possible to provide the information recording and reproducing device using the non-complete interleaving method that is capable of recording various types of discrete information da which can be rewritten by specifying block numbers and is capable of recording and reproducing successive information db such as music information.

When recording the discrete information da together with the successive information db in a single magneto-optical disk 1 but in different formats, they may be mixed up on the disk randomly by providing identification codes for them to distinguish each other, or recording areas for each information may be arranged separately beforehand.

In this embodiment, a single block was composed of eight sectors, however the value was taken for only convenience' sake. Therefore, the size of the block can be varied as needed.

For absolute addresses, if they are prerecorded and distinguishable, they can be recorded in any form, for example in the form of pits.

Further, in the above embodiment a disc-shaped recording medium of magneto-optical type was used, however, a write once type recording medium which allows one writing action and, needless to say, rewritable recording media of other types can be used. Regarding the write once recording medium, for example TeOx, TeC, and an organic pigment film are listed. The shape of the recording medium is not limited to disc which was described in the above embodiment, so tape type and card type recording media can also be used if they do not depart from the scope of the present invention.

As described above, the information recording and reproducing device of the present embodiment includes calculator for calculating physical sector numbers according to the block number of a block whereto recording and reproducing operations are performed by the block unit and the block is composed of predetermined n numbers of effective sectors, $n_1$ numbers of front dummy sectors provided in front of the effective sectors and $n_2$ numbers of rear dummy sectors provided behind; and recording unit for recording information in the physical sectors obtained by the calculator by dividing the information by the n numbers of effective sector unit and by generating and adding front additional data and rear additional data to the respective front and rear additional sectors when the information is discrete information, and for recording information successively in the physical sectors obtained by the calculator when the information is successive information.

Accordingly, the host device connected to the-present information recording and reproducing device can direct the information recording and reproducing device to record and reproduce discrete information such as text information and coded data by only specifying block numbers whereto recording and reproducing operations are performed, but not providing additional sectors which are required for recording and reproduction operations using the non-complete interleaving method. Moreover, the host device can give instructions to perform recording and reproducing operation by the block unit and can handle the information management easily as there is no need for adding data relating to additional sectors nor transferring the data.

Especially, if data is recorded in a rewritable type recording medium, it is possible to rewrite the recorded data partly when the host device gives instructions to execute rewriting operation by the block unit.

Further according to the present invention, since successive information such as music information requiring the non-complete interleaving method can be recorded on the same disk with the discrete information, various types of information can be recorded and reproduced in a signal recording medium. Besides, since various types of information can be recorded in one type of rewritable recording media, different types of recording media are not required when recording each information, resulting in a decrease in the prices of the recording media.

The following explains an information recording and reproducing device of the present invention built in an electric still camera which is capable of recording voice information. For members whose functions are the same as the members of the above embodiments, the same reference numbers are given to them and the detailed explanations are omitted here.

An information recording and reproducing device described here is also configured so as to perform recording operations in the so-called magnetic field modulation method and to perform overwriting operations for recording new information over formerly recorded information.

In order to record image information, as shown in FIG. 4, the information recording and reproducing device comprises an input terminal 6a to which image information is input from an image pickup element (not shown), an input terminal 6b to which voice information is input from a microphone (not shown), output terminals 6c, 6d from which image information and voice information are respectively released, and a terminal 6e. Control signals are input/output between the information recording and reproducing device and a host controller for controlling the respective sections of the electronic still camera, such as the image pickup element and the microphone, through the terminal 6e.

When recording image (still image) information, image information input to an interface 18 from the input terminal 6a is sent to a switching circuit 19 as digital data f. In the switching circuit 19, the digital data f and additional data e (described later) from a sector data generation circuit 20 are switched, and then digital data which is formed by adding the additional data e to the digital data f is supplied to a recorded signal processing circuit 7.

In the mean time, when recording voice information, voice information input through the input terminal 6b is supplied to the switching circuit 19 through the interface 18 as digital data f. In this case, additional data e from the sector data generation circuit 20 is not added thereto, and therefore the digital data f, as it is, is supplied to the recorded signal processing circuit 7 as digital data h and is then recorded in the same manner as described above.

Image information or voice information reproduced by an optical head 4 is amplified by a reproduction amplifier 10, is sent to a prerecorded information detection circuit 11 and a reproduced signal processing circuit 15, and is then reproduced in the same manner as described above.

The reproduced image and voice information are output to a display and voice output device (not shown) of a television set or the like through the interface 18 and the output terminals 6c, 6d.

A controller 13 for recording and reproducing information receives instructions to record or reproduce information from the host controller through the terminal 6e and the interface 18.

Figure 8:
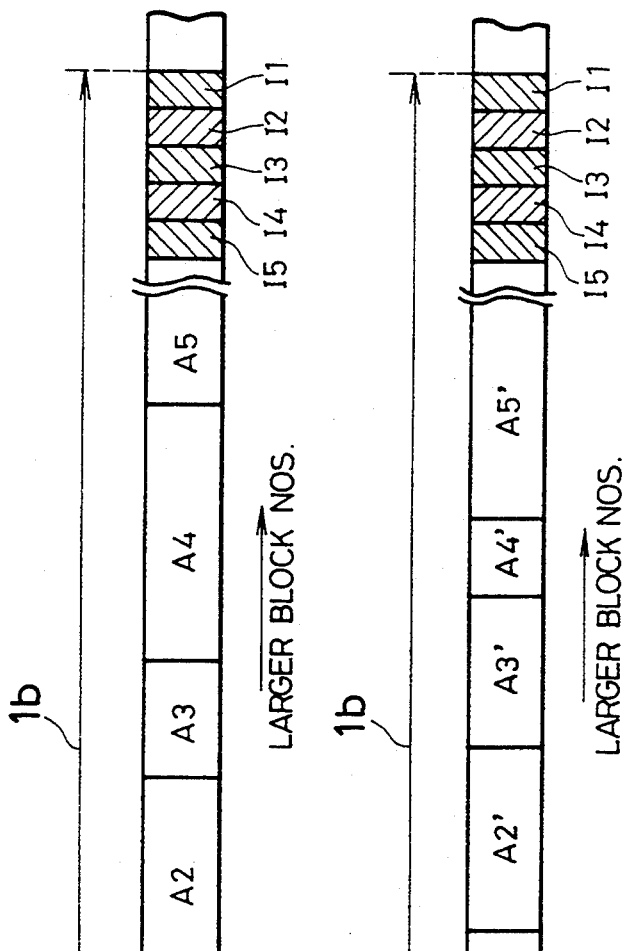

As shown in FIG. 8(a), a single block is composed, for example, of eight sectors, and information is recorded or reproduced in the information recording area 1b of a magneto-optical disk 1 by the block unit. Numbers B0, B1 . . . are given to each block in order, i.e. smaller numbers are given to blocks located near inner parts of the magneto-optical disk 1 and larger block numbers are given to blocks located near outer parts thereof (see FIG. 12).

In this embodiment, image information recording areas I1, I2 . . . (shown by hatching for convenience' sake in FIG. 8) wherein image information whose data volume is fixed is recorded are allocated in order from the outer edge of the information recording area 1b, i.e. from the largest block number, while voice information recording areas A1, A2 . . . wherein voice information whose data volume varies is recorded are allocated in order from the inner edge of the information recording area 1b, i.e. from the smallest block number. In the information recording areas I1, I2 . . . , image information is recorded from the smallest block number toward the larger block numbers.

According to the above information allocation, since blank areas are only present in a location between the image information recording areas 11, 12 . . . and the voice information recording areas A1, A2 . . . , wherein no information is recorded, the utility factor of the information recording area 1b can improve.

In case of rewriting recorded information, as shown in FIG. 8(b), voice information relating to all the recorded image information can be rewritten by the block. In the figure, A1', A2' . . . represent the respective voice information recording areas after having been rewritten.

In case recorded voice information is unnecessary, a group of voice information successively recorded can easily be erased, and successive blank areas presented due to the erasing operation can be used for recording image information.

Figure 9:
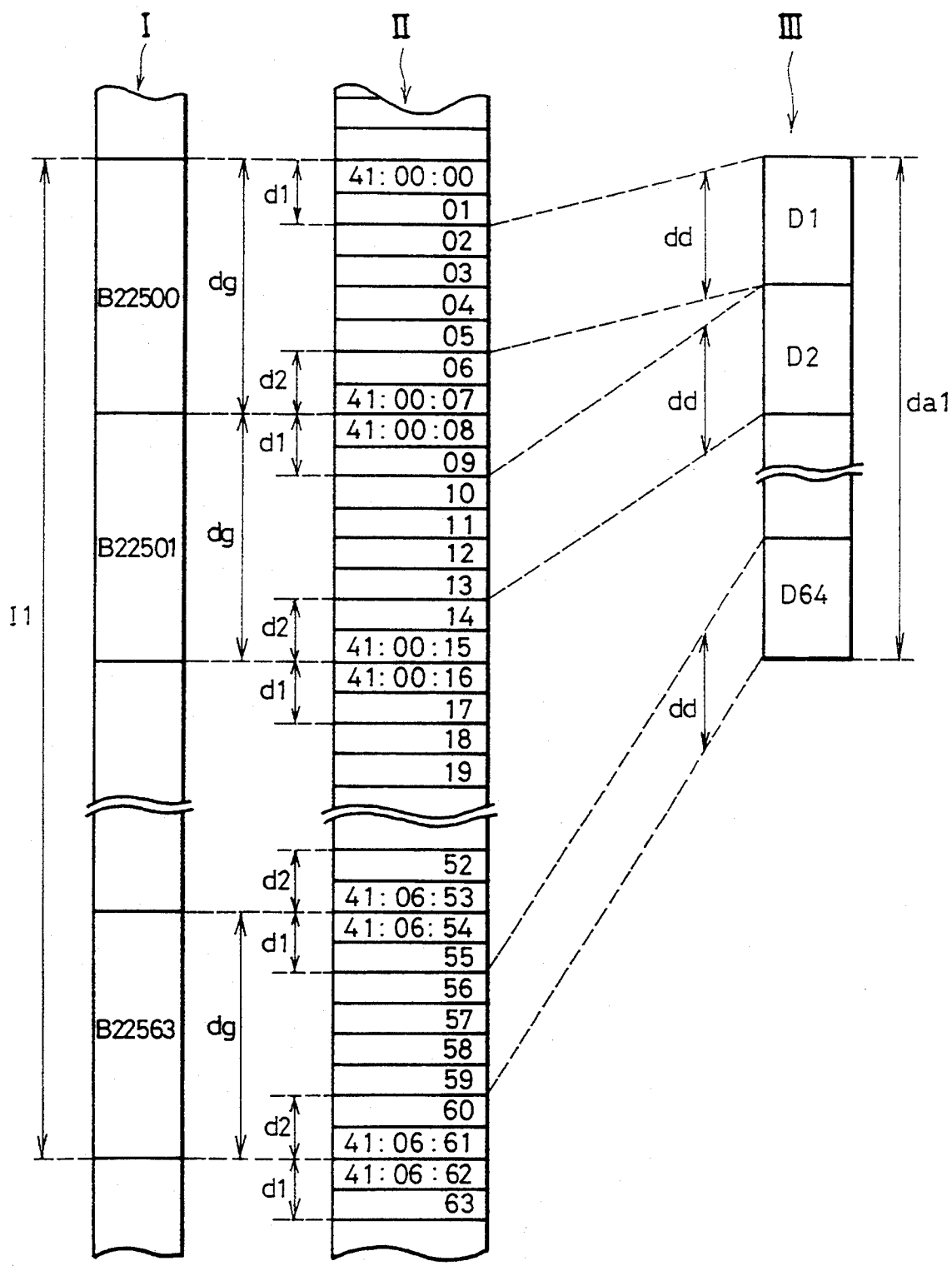

Next, referring to FIG. 9 the following explains address control to be performed when the present information recording and reproducing device records image information in the magneto-optical disk 1. I of the figure shows the block structure in the information recording area 1b and II the sector structure of each block. As shown in I of the figure, each block is provided with a block number such as B22500, B22501 . . . B22563 . . . , while as shown in II of the figure each sector of the blocks is provided with a physical sector number indicated as a function of time "minute":'-'second': a sector number in one second (a value from 00 to 74 as there are 75 sectors in one second in this embodiment). Data dg in each block is composed of eight sectors. Block No. B0 (see FIG. 12) is given to a block located in the innermost of the information recording area 1b, and for example, physical sector No. (01:00:00) is given to the first sector of the block.

When recording image information, the controller 13 for recording and reproduction, in response to instructions to record the information in a specified range of blocks given from the host controller through the interface 18, calculates actual physical sector numbers corresponding to the blocks. Referring to FIG. 9, the following explains the operation more precisely.

For example, in case the host controller specifies block No. B22500 to block No. B22563 as information recording area I1 to record image information da1 of a first image, since the number of sectors per block is the predetermined eight sectors and the first physical sector number of block No. B0 is predetermined (01:00:00), the first physical sector number of block No. B22500 where the recording operation is commenced can be given by the equation:

(01:00:00)+block No. (22500)×the number of
sectors (8)=(41:00:00)

Thus, the first physical sector number of block No. B22500 can easily be obtained. When the physical sector numbers of block No. B22500 is obtained, access operations to the block are performed.

In this embodiment, a single block is composed of eight sectors, however, in fact the image information da1 is only recorded in the middle four sectors thereof which are effective sectors dd, and front additional data d1 and rear additional data d2 are respectively recorded in the first two sectors and the last two sectors of each block.

When recording and reproducing data recorded in the effective sectors dd based on the non-complete interleaving method called CIRC, if reproduction errors occur in the data recorded in the effective sectors dd, the front additional data d2 and the rear additional data d2, which are dummy data including error detection and correction parity, detect and correct the errors. By adding the front additional data d1 and rear additional data d2 to each block, even if information is rewritten by the block unit, data stored in the effective sectors dd of the respective blocks can be reproduced accurately.

As described above, after calculating the first physical sector number of block No. B22500 (see FIG. 10(a)) and performing the access operation thereto, the switching circuit 19 switches additional data e (see FIG. 10(b)) and digital data f consecutively so as to record desired information. The additional data e is composed of the front additional data d1 (see FIG. 10(d)) and the rear additional data d2 given from the sector data generation circuit 20, and the digital data f is composed of divided data D1 which is the first data obtained by dividing the image information da1 of the first image provided through the interface 18 by four sectors corresponding to the effective sectors dd.

The following explains again the process of recording information in block No. B22500. First, the front additional data d1 to be recorded in physical sector No. (41:00:00) and the following sector is given by the sector data generation circuit 20 and is supplied to the recorded signal processing circuit 7 through the switching circuit 19, and is then recorded in the information recording area 1b of the magneto-optical disk 1 (see period t1 of FIG. 10).

Figure 10:
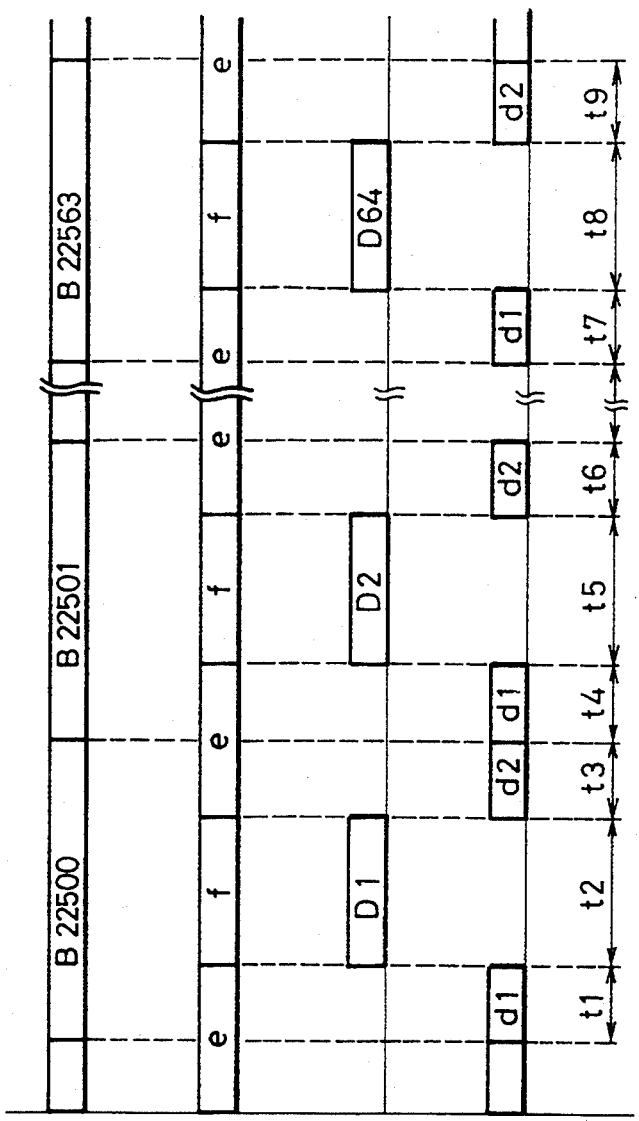

Next, physical sector No. (41:00:02) and the following three sectors which are equivalent to the size of the effective sectors dd are provided as a group of sectors for the divided data D1 of the image information da1 given through the interface 18, and the data is supplied to the recorded signal processing circuit 7 through the switching circuit 19 and is then recorded therein (see period t2 of FIG. 10).

Then, the rear additional data d2 corresponding to two sectors, i.e. physical sector No. (41:00:06) and the following sector is given from the sector data generation circuit 20, and is supplied to the recorded signal processing circuit 7 through the switching circuit 19 and is then recorded therein (see period t3 of FIG. 10).

In the above process, the recording operation for one block is completed and thereafter data is successively recorded in blocks No. B22501 to B22563 through the respective process shown in periods t4 to t9.

When recording image information da2 of a second image, a range of blocks in the image information recording area I2 is arranged such that the last block thereof is located in front of the first block of the image information recording area. I1 and the number of blocks of the image information recording I2 equals the that of the information recording areas I1. Based on the above arrangement, physical sector numbers are calculated. Regarding image information recording areas I3, I4 . . . of a third and the following image information, ranges of blocks are arranged so that the number of blocks for each piece of image is fixed and the block number of a group of blocks to which information is to be recorded becomes gradually smaller. Based on this arrangement, physical sector numbers are calculated.

For the area management of the recorded image information da1, the host controller may allocate predetermined blocks for the area management information so as to perform the recording operation in the same process as above. The information may also go through the following process: (i) going through the controller 13 and a TOC memory 14; (ii) being converted into a predetermined format by a sub-code generation circuit 17; (iii) being supplied to the recorded signal processing circuit 7; and (iv) being recorded. In the case of the latter process, normally the area management information is recorded in the TOC area 1a.

Figure 11:
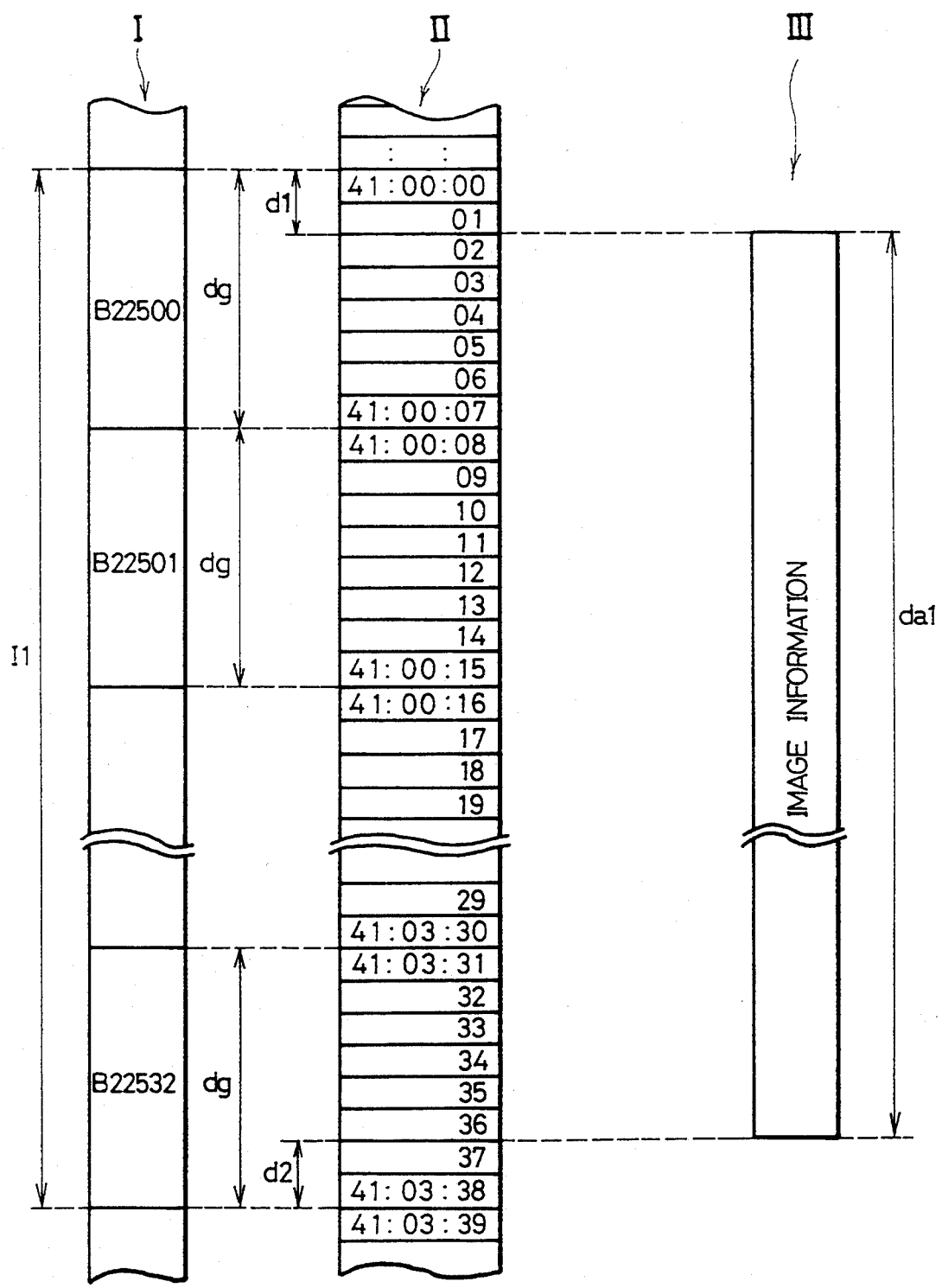

Instead of giving the front additional data d1 and rear additional data d2 to each block when recording the image information da1, da2 . . . as shown in FIG. 9, the front additional data d1 may only be given to the first block of a group of blocks and the rear additional data d2 to the last block thereof, and the image information da1, da2 may be recorded successively in the rest of the blocks as shown in FIG. 11. In this case, for example, the recording of the information da1 of the first image, is completed at block No. B22532, thereby permitting the utility factor of the information recording area 1b to improve.

Next, referring to FIG. 12 a recording operation of voice information is explained below. I in the figure shows the block structure and II the sector structure, and as described above the data dg of a single block is composed of eight sectors. III in the figure shows voice information to be recorded.

The controller 13 for recording and reproduction first, in response to instructions to record information in a specified block and the following blocks given from the host controller through the interface 18, performs operations to convert the block numbers into actual physical sector numbers. Referring to FIG. 12, the following explains the operations more precisely.

For example, voice information recording area A1. (see FIG. 8(a), wherein voice information db1 corresponding to the first image is recorded, starts from the smallest block number, i.e. block No. B0 in the information recording area 1b. Since, it is predetermined to give physical sector No. (01:00:00) to the first sector of block No. B0, the controller 13 for recording and reproduction performs an access operation to the sector.

Then, the voice information db1 entered from the input terminal 6b through the interface 18 is supplied to the recorded signal processing circuit 7 as digital data h through the switching circuit 19, so that the information db1 is successively recorded in sector No. (01:00:00) and the following sectors. Namely, in the case of recording the voice information db1, since all the eight sectors of one block are the corresponding sectors, front additional data and rear additional data are not added.

When the host controller gives instructions to end the recording operation to the controller 13 for recording and reproduction through the interface 18, the recording of the voice information db1 is ended. According to a case shown in FIG. 12, the recording of the voice information db1 is ended at block No. B74. In this case, succeeding blocks, block No. B75 and the following blocks are allocated for voice information recording area A2 where voice information for the second image is to be recorded. When recording information in the voice information recording area A2, the physical sector number of the first sector of block No. B75 is calculated in the same process as above. Further, the physical sector numbers of the first sectors in voice information recording areas A3, A4 . . . for third and the following images can be calculated in the same process.

The area management of the recorded voice information db1, db2 . . . will be achieved in the following way. Upon receiving instructions to perform recording operation from the host controller, the controller 13 sends the instructions to the sub-code generation circuit 17 through the TOC memory 14. In the sub-code generation circuit 17, input data is converted into a predetermined format and is supplied to the recorded signal processing circuit 7, and is then recorded as area management information. In this case, the area management information is recorded in the TOC area 1a.

When reproducing the image information da1, da2 . . . or the voice information db1, db2 . . . thus recorded, the host controller gives instructions to perform reproducing and the block numbers of areas to be reproduced to the controller 13 for recording and reproduction through the interface 18. Then, the controller 13 converts the block numbers into physical sector numbers and performs necessary access operations so as to execute the reproducing operation.

According to FIG. 9, when reproducing the image information da1, da2 . . . , a reproduced signal from the optical head 4 is amplified by the reproduction amplifier 10, and the magneto-optical component of the reproduced signal goes through the EFM demodulation process in the reproduced signal processing circuit 15 and goes through an error detection and correction process using error detection and correction parity. In the error detection and correction process, the reproduction of effective sectors dd is performed by using the additional data e composed of the front additional data d1 recorded in the front additional sectors of FIG. 9 and the rear additional data d2 recorded in the rear additional sectors. Only divided data D1, D2 . . . of the reproduced signal data, which are recorded in four sectors corresponding to the effective sectors dd, are released at each block through the interface 18 and the output terminal 6c.

Figure 12:
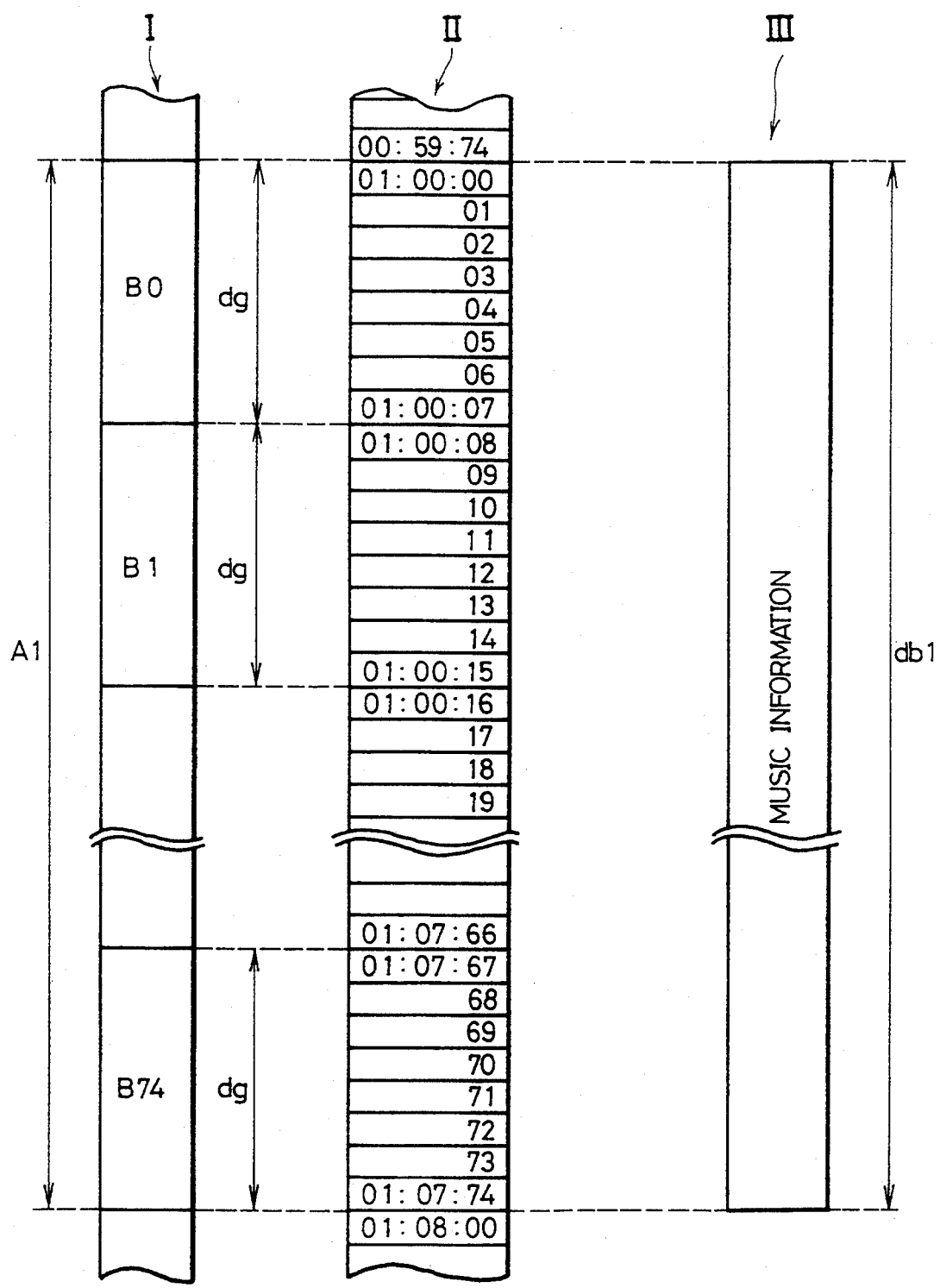

According to FIG. 12, when reproducing the voice information db1, db2 . . . , a reproduced signal from the optical head 4 is amplified by the reproduction amplifier 10, and the magneto-optical component of the signal goes through the EFM demodulation process in the reproduced signal processing circuit 15, goes through an error detection and correction process using error detection and correction parity, and are then released through the interface 18 and the output terminal 6d.

This embodiment was explained by using image information of an electronic still camera as information whose volume is fixed and voice information thereof as information whose volume varies, however the present invention is also effective in a case where the information whose volume is fixed and the information whose volume varies are recorded variously in a recording medium.

In this embodiment, a single block was composed of eight sectors, however the value was just taken for convenience' sake. Therefore, the size of the block can be changed as needed.

For absolute addresses (physical sector numbers), if they are prerecorded and distinguishable information, they can be recorded in any form, for example in the form of pits.

In this embodiment a disc-shaped recording medium of magneto-optical type was used, however, rewritable recording media of other types can be used and tape type and card type recording media can also be used if they do not depart from the scope of the present invention.

The following explains another embodiment relating to an information recording and reproducing device of the present invention in detail. For members having the same functions as the members of the above embodiments, the same reference numbers are given to them and the detailed explanations are omitted here.

Figure 13:
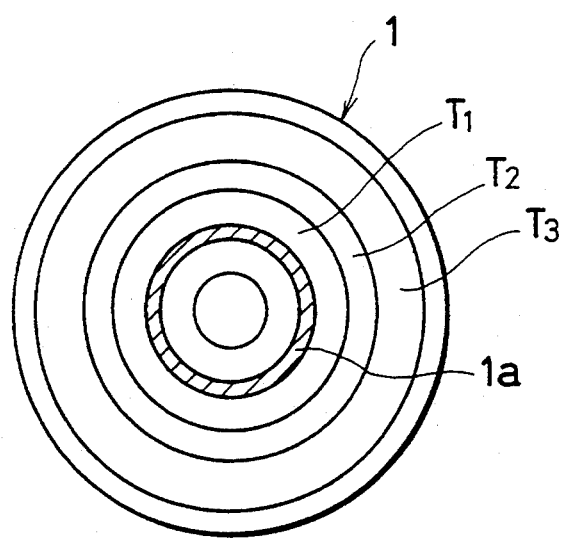

As shown in FIG. 13, a magneto-optical disk 1 of this embodiment whose structure is shown in FIG. 5 and FIG. 6 is divided into three ring-shaped areas $T_1$ to $T_3$ (units).

In this embodiment, the area $T_1$ corresponds to track No. 1 of the CD format, the area $T_2$ track No. 2, and the area $T_3$ track No. 3. As shown in Table 1, track No. 1 occupies physical sector No. (01:23:00) to physical sector No. (09:22:74), track No. 2 physical sector No. (09:24:00) to physical sector No. (29:23:74), and track No. 3 physical sector No. (29:25:00) to physical sector No. (57:24:74). Here, the physical sector number is indicated as successive time information increasing from the inner edge of the magneto-optical disk outward thereof in order, i.e. (minute:second:frame information). Since the sector length is 13.3 ms, there are 75 sectors in one second, and therefore the frame is indicated by a number from 00 to 74.

TABLE 1

| TRACK NO. | AREA INFORMATION | | NUMBER OF SECTORS/BLOCK |
|---|---|---|---|
| | START POSITION | END POSITION | |
| 1 | 01:23:00 | 09:22:74 | 8 |
| 2 | 09:24:00 | 29:23:74 | 12 |
| 3 | 29:25:00 | 57:24:74 | 16 |

Regarding the block size in each track, it is predetermined that a single block in track No. 1 is composed of eight sectors, a single block in track No. 2 is composed of 12 sectors and a single block in track No. is composed of 16 sectors. The data of Table 1 is recorded in a TOC area 1a (unit information recording area) shown in FIG.

13 as management/format information of the respective areas. Based on the contents of the TOC area 1a, the location of information areas on the disk and the size of a block in each area can be recognized.

FIG. 14 is a typical depiction illustrating the relationship between physical sector numbers, block numbers and track numbers, and shows that track No. 1 corresponds to the physical sectors, No. (01:23:00) to No. (09:22:74), on the disk. In the area $T_1$ of track No. 1, since a single block is composed of eight sectors, block No. 0 corresponds to the physical sectors, No. (01:23:00) to No. (01:23:07) and block No.1 the physical sectors, No. (01:23:08) to No. (01:23:15). As the size of the area $T_1$ of track No. 1 corresponds to the size of physical sector No. (01:23:00) to physical sector No. (09:22:74), that is equivalent to (08:00:00), the number of sectors in the area $T_1$ of track No. 1 is $8 \times 60 \times 75 = 36000$ sectors. The number of blocks is $36000/8 = 4500$ blocks. Therefore, the blocks, No. 0 to No. 4499, are allocated for track No.1.

Similarly, track No. 2 corresponds to the physical sectors, No. (09:24:00) to No. (29:23:74), on the disk. In the area $T_2$ of track No. 2, since a single block is composed of 12 sectors, block No. 0 corresponds to the physical sectors, No. (09:24:00) to No. (09:24:11). The number of sectors in the area $T_2$ of track No. 2 is $20 \times 60 \times 75 = 90000$ sectors. The number of blocks is $90000/12 = 7500$ blocks. Therefore, the blocks, No. 0 to No. 7499, are allocated for track No. 2.

Further, track No. 3 corresponds to the physical sectors, No. (29:25:00) to No. (57:24:74), on the disk. In the area $T_3$ of track No. 3, since a single block is composed of 16 sectors, block No. 0 corresponds to the physical sectors, No. (29:25:00) to No. (29:25:15). The number of sectors in the area T3 of track No. 3 is $28 \times 60 \times 75 = 126000$ sectors. The number of blocks is $126000/16 = 7875$ blocks. Therefore, the blocks, No. 0 to No. 7874, are allocated for track No.3. XX of the figure represents border areas between the tracks, and blocks corresponding to the border areas are not numbered.

According to the allocation of information areas wherein a single block in track No. 1 is composed of eight sectors, a single block in track No. 2 is composed of 12 sectors and a single sector in track No. 3 is composed of 16 sectors, by specifying the respective block numbers, data can be recorded or reproduced in the appropriate blocks according to the data volume, so that various types of information including file management information can be stored in appropriate blocks in a single disk.

For example, the information volume of text information and the like is comparatively low as it is coded data, and therefore the information can be recorded and reproduced more efficiently in the area $T_2$ corresponding to track No. 2. On the contrary, since the information volume of image information or the like is high, according to the above allocation the information can be recorded more efficiently in the area $T_3$ corresponding to track No. 3. Further, since the information volume of file management information, such as the directories of various files of track No. 2 and track No. 3, is normally low, according to the allocation the file management information can be recorded more efficiently in the area $T_1$ corresponding to track No. 1. Every time a new file is created and data is added, updated, erased or read out in track No. 2 or track No. 3, the file management information in the area $T_1$ of track No. 1 is updated. The sizes of the blocks mentioned above are just examples provided to meet the convenience of the explanation, and therefore the sizes can be determined accordingly.

Regarding the file management information, there are directories, File Allocation Table (FAT) and the like. For example as to MS-DOS (disk operating system of Microsoft Corp.), according to page 35 of "applied MS-DOS" published by Kabushiki Kaisha ASCII in Japan, on July 31 in 1986, the name, type (command, data, etc.), attribute, updated date, size and first cluster number of a file and the like are recorded in the directory for each file, and cluster numbers used in the respective files are recorded in order in the FAT. In this embodiment, for example the track number and block number may be recorded in the directory instead of the first cluster number of a file in MS-DOS, and the block numbers may be recorded in order in the FAT instead of the cluster numbers.

In this embodiment, the explanation was made by referring to a case where the positional information, block size information and the like of the respective information areas are allocated in the TOC area 1a as shown in FIG. 13, however the information can be allocated in different ways if it is recorded in a predetermined area.

For absolute addresses (physical sector numbers), if they are prerecorded and distinguishable information, they can be recorded in any form.

Figure 15:
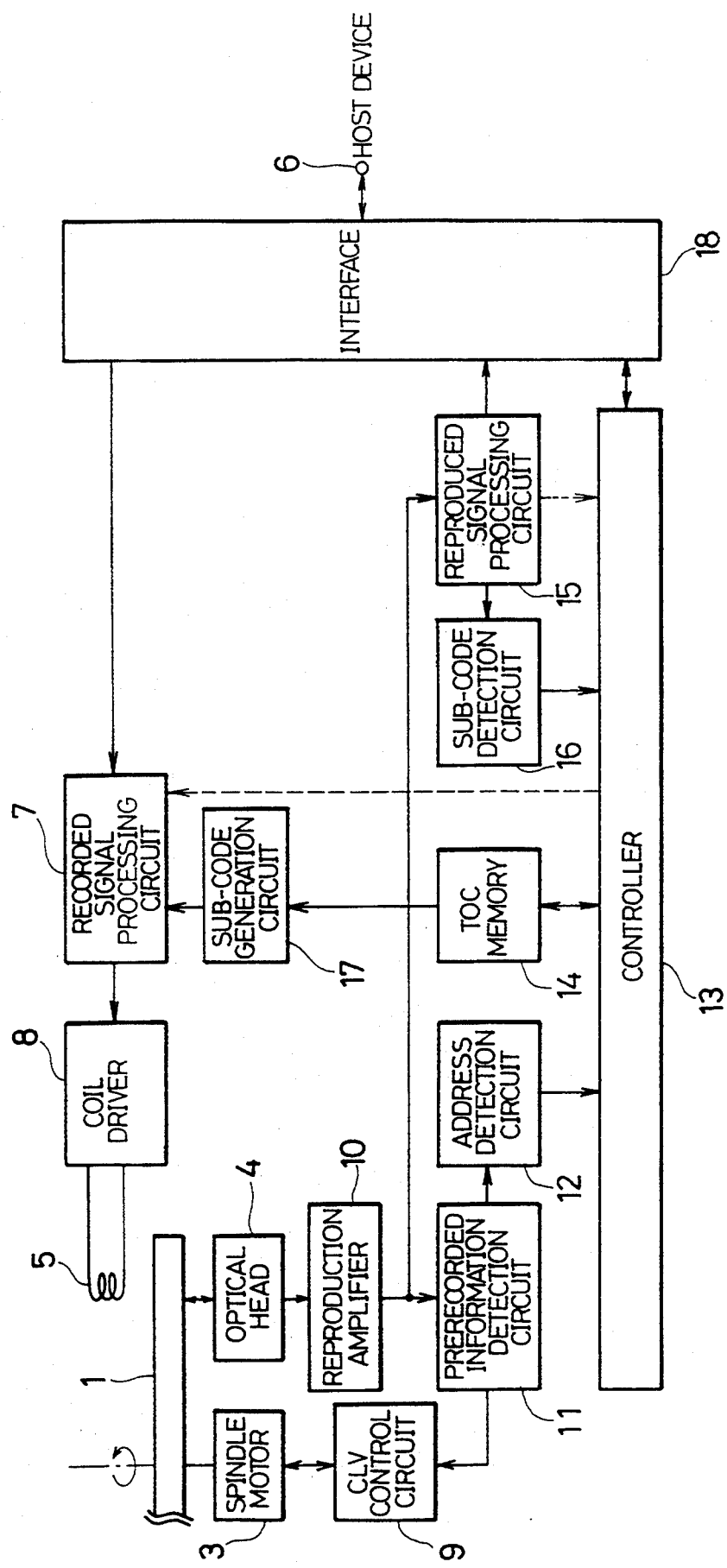

As shown in FIG. 15, the controller, as a processing section of the information recording and reproducing device of this embodiment, performs the following operations in response to instructions given by the host device.

When the disk of the present embodiment has an initialized state (no information is recorded), the unit allocation information (a unit is a collection of blocks) on the recording medium, sector number information indicating the number of sectors per block and unit number information identifying each unit, which are given from the host device through the interface 18 are transferred to a TOC memory 14 as a unit (or track). This corresponds to the data of Table 1.

Immediately after performing an access operation to a location corresponding to the TOC area 1a of the magneto-optical disk 1 by controlling an optical head/-coil shifting means (not shown), the data of the TOC memory 14 goes through a predetermined process in a sub-code generation circuit 17 and the recorded signal processing circuit 7 and is then recorded by driving a coil 5 through a coil driver 8. This series of the operation may be performed immediately before the disk 1 is discharged from the information recording and reproducing device, instead of performing when transferring information from the host device.

The recording of information relating to the unit is performed by transferring information from the host device when the disk is initialized or when adding or changing units.

In the embodiment, information, including unit number information for identifying each unit was recorded in the TOC area 1a, however, the unit number information is unnecessary if the allocation of information relating to the respective units is determined according to absolute addresses in the TOC area 1a.

As described above, when the disk 1 whose TOC area 1a contains the area information of each track and the number of sectors of each block is loaded, first the data in the TOC area 1a is read. The load action is initiated when the disk 1 is placed into the present information recording and reproducing device if it is in an initialized state, or when the recording and reproducing device is turned on again if it is turned off with the disk 1 therein. More concretely, the controller 13 controls the optical head/coil shifting means (not shown) and moves the optical head 4 to a position on the disk corresponding to the TOC area 1a so as to perform the reproduction operation.

The information in the TOC area 1a is directed to the reproduced signal processing circuit 15 through the optical head 4 and the reproduction amplifier 10, and the actual TOC information is supplied to the controller 13 from the reproduced signal processing circuit 15 through a sub-code detection circuit 16. The TOC information is stored as operational information for the succeeding recording and reproducing operations in the TOC memory 14, and can be sent to the host device through the interface 18. In the succeeding information recording and reproducing operations, in response to a unit number and predetermined blocks of the unit specified by the host device through the interface 18, the controller 13 performs physical sector address operation by the use of the data of the TOC memory 14.

Referring to FIG. 14, the following explains the above operation more precisely.

For example, when the host device gives instructions to record new data in unit No. 2 in a predetermined file name, the file management information recorded in track No. 1 is first read out and then an unused block in track No. 2 is detected. If the block number of the unused block is block No. 1, since the area of track No. 2 begins at sector No. (09:24:00) according to the TOC memory and the block is composed of 12 sectors, the first physical sector address of block No. 1 can easily be obtained from the equation.

(09:24:00)+block number (1)×the number of sectors (12)=(09:24:12)

After performing necessary access operations to the physical sector thus obtained, the recording information is transferred through the interface 18 so as to execute the recording operation of the desired information. Needless to say, in the operation, management information such as the name of the above file is added to an unused block in the directory recording area of track No. 1 and at the same time management information such as the block number where the file is stored is recorded in an unused block of the FAT recording area.

When the host device gives instructions to record information in beginning block No. 1 of unit No. 1 and the following blocks, according to the TOC memory 14, since track No. 1 begins at sector No. (01:23:00) and each block is composed of eight sectors, the first physical sector address of block No. 1 can easily be obtained from the equation.

(01:23:00)+block number (1)×the number of sectors (8)=(01:23:08)

Necessary access operations to the physical sector numbers thus obtained are performed and then recording information is transferred through the interface 18, which allows the desired information to be recorded.

In the embodiment, information relating to the respective units (information on the block sizes of the respective units or the like) was recorded and reproduced in the TOC area 1a of the disk 1, however, the information can be recorded and reproduced in an area other than the TOC area if it is a predetermined area. The information relating to the respective units can also be recorded and reproduced in a main data area instead of a sub-code area. In this case, the controller 13 is connected to the recorded signal processing circuit 7 and the reproduced signal processing circuit 15 as shown by the broken line of FIG. 15, and the recording and reproducing operations of information relating to the respective units are performed.

According to the above arrangement, areas on the disk are composed of different numbers of blocks and the information capacity of the respective areas varies so as to correspond to various types of information including the file management information, and the file management information of all the files can be managed collectively. As a result, the respective information can be recorded and reproduced easily and efficiently.

In this embodiment a disc-shaped recording medium of magneto-optical type was used, however, rewritable recording media of other types can be used and recording media of tape, card or other type can also be used if they do not depart from the scope of the present invention.

As described above, the information recording and reproducing device of the present embodiment comprises a processing means which allocates units composed of collections of blocks on the recording medium so that the allocation information of the respective units on the disk and the sector number information of the respective blocks of each unit are recorded in the predetermined unit information recording area on the recording medium and manages files by the use of a unit for recording file management information provided separately from a unit for recording files. Therefore, blocks composed of different numbers of sectors can be provided on a single disk. As a result, blocks of the optimum sizes can be allocated for various types of information according to the data length, permitting the recording area of the recording medium to be used efficiently. Moreover, since a unit where the file management information of all the units is to be recorded are provided, the file management information can be recorded in blocks composed of the optimum number of sectors, allowing the utility factor of the recording medium and the average recording and reproducing speed of data to improve. When replacing the recording medium, the recording conditions of the files of each unit can be recognized promptly by reading out just the unit where the file management information is recorded.

Figure 16:
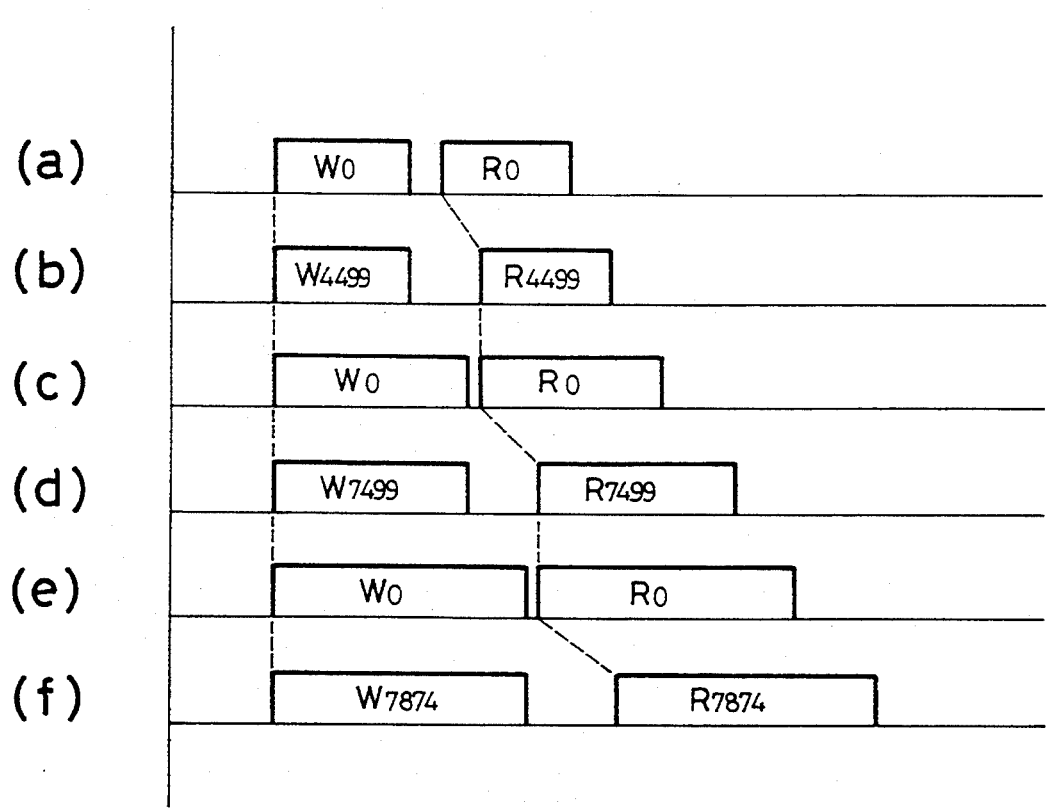
Figure 17:
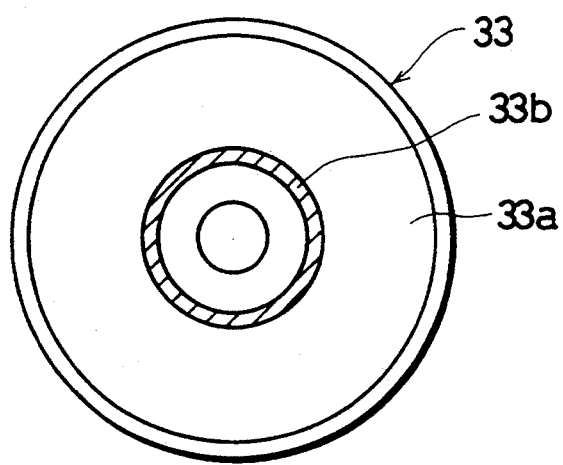
FIG. 17 to FIG. 22 show conventional examples.

Besides, even if the digital information or the like is recorded or reproduced in the area $T_1$ corresponding to track No. 1 instead of the area $T_2$ corresponding to track No. 2, the information can be recorded and reproduced efficiently. In this case, image information and the like can be recorded in the area $T_3$ corresponding to track No. 3 as the information volume is high. Needless to say, the sizes of the blocks mentioned above are just examples provided to meet the convenience of the explanation, and therefore the sizes can be determined accordingly. FIG. 16 is a time chart of a case where recording operations and reproducing operations for verification were repeatedly performed in the disk of this embodiment by the block unit.

Absolute address information as prerecorded information is recorded on the above disk based on the Constant Linear Velocity (CLV) .method, so that the following recording and reproducing operations must be performed in the CLV method as well, using the prerecorded absolute address information. The areas $T_1$, $T_2$, and $T_3$ are arranged such that the block size in each area is close to (but does not exceed) the number of sectors in one disk rotation.

In FIG. 16, the axis of abscissa shows the lapse of time, (a) and (b) are charts for a recording operation and a reproducing operation for verification performed respectively at the inner and outer edges of the disk in the area $T_1$ (i.e. track No. 1) of FIG. 13, (c) and (d) are charts for a recording operation and a reproducing operation for verification performed respectively at the inner and outer edges of the disk in the area $T_2$ (i.e. track No. 2), and (e) and (f) are charts for a recording operation and a reproducing operation for verification performed respectively at the inner and outer edges of the disk in the area $T_3$ (i.e. track No. 3). $W_o$ of FIG. 16 shows a recording operation performed in block No. 0, and $R_o$ of the figure shows a reproducing operation for verification performed after the recording operation in block No. 0. Subscript characters affixed to the letters W and R indicate block numbers, and similar to above, shows a recording operation and a reproducing operation for verification performed in the respective position on the disk. Consequently, the time elapsed between the beginning of the recording operation and the beginning of the reproducing operation for verification equals the time taken for a single rotation of the disk at the respective information positions, and the wait time for the disk rotation to proceed to the reproducing operation for verification from the recording operation is given by subtracting the time taken for the recording operation from the above time.

As is clear from FIG. 16, since the sizes of blocks becomes larger from inside portions outward of the disk in this embodiment, the wait time for the disk rotation does not increases much even in outer parts of the disk. Consequently, recording operations and reproducing operations for verification can efficiently be performed by the block unit based on the CLV method independently of any radius location of the disk.

In this embodiment, the positional information and the block size information of the respective information areas are stored in the TOC area 1a (see FIG. 13), however the information can be recorded in other areas if they are predetermined areas.

In the embodiment, to meet the convenience of the explanation, the disk is divided into three areas (units), $T_1$, $T_2$, and $T_3$, and the block sizes (the number of sectors in one block) in the areas are determined as 8, 12 and 16 respectively. However, the block size, the number of areas (unit), the number of blocks in one area (unit) can be changed if necessary.

In order to improve the average recording and reproducing speed of data, the numbers of sectors are arranged as 8, 12, and 16 as described above, which are close to the numbers of sectors in one disk rotation in the respective areas. In other words, in the case of using a rewritable type recording medium in the shape of a disc (for example, a magneto-optical disk), a reproduction operation for verification needs to be performed immediately after the completion of the recording, and therefore the way of arranging the block size affects the average recording and reproducing speed of data.

For example, if the linear velocity of the disk controlled based on the CLV method is 1.2 m/s, the allowable number of sectors in each of the innermost tracks in the recording areas $T_1$, $T_2$ and $T_3$ is 10.2, 12.2, and 16.2 respectively according to the calculation. If the block sizes are arranged to be close to the numbers of sectors (positive integral numbers), the wait time for the disk rotation (the time taken between the completion of the recording information in a block and the starting of a reproduction operation for verification after performing a track jump) is shortened, which allows the average recording and reproducing speed of data to improve to a great degree.

If the number of sectors in the block in the area T1 is determined as, for example, 20 ($<10.2\times2$) or 30 ($<10.2\times3$), the average recording and reproducing speed of data is achieved to a similar extent to the above.

Generally, if the block size is determined so as to correspond to the number of sectors in N-time disk rotation or slightly less, or even if the numbers of areas (units) are increased, similar to the above the average recording and reproducing speed of data can improve.

More precisely, the average speed of recording and reproducing data can improve greatly when the block size Bs is determined so as to satisfy the equation $$((m \times n - 0.5\ m) < Bs < (m \times n)$$

where m is the number of sectors in one disk rotation in the innermost portion of each unit (number of sector/rotation) and n (a positive integral number) is the number of tracks in one block in the innermost portion of each unit.

For absolute addresses, if they are prerecorded and distinguishable information, they can be recorded in any form.

Thus, the recording and reproducing operations of the respective information can be performed efficiently by providing areas, which are composed of blocks having information capacity appropriate for various types of information, on the disk.

In this embodiment a disc-shaped recording medium of magneto-optical type was used, however, a write once type recording medium which allows one writing action and, needless to say, rewritable type recording media of other types can be used. Regarding the write once type recording medium, for example, TeOx, TeC, and an organic pigment film are listed. The shape of the recording medium is not limited to disc, so tape type and card type recording media can also be used if they do not depart from the scope of the present invention.

Especially, in the case of applying the present invention to a rewritable type recording medium, it is possible to erase information by the block unit (for example, by each format) and each unit size (the number of blocks in one unit) can easily be changed, i.e. increasing-/decreasing the unit size or block size. Consequently, a recording medium can be efficiently used.

For instance, in case information in the area $T_2$ is unnecessary and more capacity is needed for the area $T_1$, it is possible to increase the capacity of the area $T_1$ by erasing only the information in the area $T_2$ and recording in the area $T_2$ information having the same format as the information in the area $T_1$. In case information is recorded in a plurality of areas with arbitrary block sizes, it is possible to improve the average speed of recording and reproducing information during rewriting operations thereafter by rearranging the block size of each unit such that the block size becomes larger from the innermost outward of the disk (relocation of information).

As described above, the recording medium relating to the present embodiment is provided with a plurality of units which are collections of blocks and a unit information recording area wherein allocation information of each unit on the recording medium and sector number information indicating the number of sectors in one block in each sector are recorded, thereby permitting various blocks having different numbers of sectors to be provided on a single recording medium. As a result, blocks composed of appropriate numbers of sectors can be allocated for various types of information according to the data length, which allows the recording area of the recording medium to be used efficiently. Thus, the average recording and reproducing speed of data improves. Moreover, since the recording medium of the present invention can cope with various forms of information of different data lengths, if absolute address information is prerecorded, only one type of recording media needs to be prepared. Consequently, the recording media can be shared among various types of information and the price can be decreased.

As described above, the information recording and reproducing device of the present invention comprises a processing section which allocates units composed of collections of blocks on the recording medium so that the allocation information of the respective units on the recording medium and the sector number information of the respective blocks of each unit are recorded in the predetermined unit information recording area of the recording medium, and which reads the information every time the recording medium is loaded and calculates physical sector numbers corresponding to the blocks of a unit specified by a host device during recording and reproducing operations according to the read information. Therefore, allocation information of the respective units and sector number information of each block can be recorded in the predetermined unit information recording area on the recording medium by the present information recording and reproducing device. As a result, the host device can allocate information to blocks composed of the optimum number of sectors according to the data length of the information, thereby allowing the recording area of the recording medium to be used efficiently. In case a disk (rewritable type) is used as a recording medium where information is recorded and reproduced in the constant linear velocity method, a reproduction operation for verification needs to be performed after the recording. Therefore, if the block size of each unit is arranged so as to be slightly smaller than the number of the sectors corresponding to N-time disk rotation (N is a positive integral number), the wait time for starting the verification can be shortened, which permits the average speed of recording and reproducing data to improve to a great degree. Further, the host device can direct the information recording and reproducing device to perform recording and reproducing operations by only specifying units and blocks.

Furthermore, especially in case of applying the present invention to a rewritable type recording medium, information can be erased unit by unit. Therefore, it is possible to rearrange the erased unit to be a unit comprising blocks of a different size, or to increase/decrease each unit size easily. Consequently, a recording and reproducing device which is capable of using a recording medium efficiently can be provided.

For example, with the present invention, it is possible to allocate a unit for information having the same format and other units for information having different formats, and therefore information having various formats can be recorded in a single recording medium. In addition, it is possible to erase only a unit containing unnecessary information easily. As a result, an erased unit can be used for recording information having one of the other formats recorded on the recording medium, or can be used as a new unit with a block size which varies from the previous one so as to be allocated for recording information having a different format.

The invention being thus described, it may be obvious that the same may be varied in many ways. Such variations are not to be regarded as a departure from the scope of the invention.

There are described above novel features which the skilled artisan will appreciate give rise to advantages. These are each independent aspects of the invention to be covered by the present application, irrespective of whether or not they are included within the scope of the following claims.

What is claimed is:

1. An information recording and reproducing apparatus for block by block recording and reproducing of information on a rewritable recording medium, wherein each block is a minimum recording unit which includes predetermined numbers of sectors, the sectors being provided with physical sector numbers identifying each sector according to prerecorded absolute address information, comprising:

recording means for recording information on the recording medium; and processing means for i) controlling said recording means to record in a unit information recording area of the recording medium allocation information of recording units indicative of collections of blocks of the recording units and sector number information indicative of the number of sectors per block in each recording unit, the allocation information and the sector number information being provided by a host devices, ii) calculating physical sectors of the recording medium for corresponding blocks of a recording unit specified by said host device during recording and reproducing operations by reading the allocation and sector number information recorded in the unit information recording area when the recording medium is loaded into the information recording and reproducing apparatus, and iii ) directing said recording means to access the physical sectors.

2. The information recording and reproducing apparatus of claim 1, wherein the number of sectors of a block is predetermined so that various types of information can be allocated to blocks comprising optimum numbers of sectors according to data lengths of the respective information.

3. The information recording and reproducing apparatus of claim 2, wherein the recording medium comprises a disk and a recording unit is arranged such that block size Bs can meet $$((m \times n) - 0.5\,m) < Bs < (m \times n)$$

wherein m is the number of sectors in one disk rotation in an innermost position of each recording unit on the disk and n is the number of tracks in one block, so that the time required for starting a reproducing operation for verification after completing the recording operation and for making a track jump becomes substantially constant regardless of any radius location of the recording medium.

4. The information recording and reproducing apparatus of claim 1, further comprising:

file management means for managing files by recording file management information separately from the files.

5. The information recording and reproducing apparatus of claim 4, wherein the file management information comprises a directory and a file allocation table, track numbers being recorded in the directory while block numbers are recorded in order in the file allocation table.

6. The information recording and reproducing apparatus of claim 1, wherein the capacity of a recording unit can be changed by erasing information, the number of physical sectors in one block in each recording unit rearrangeable from an inner portion of the recording medium to become larger so that the recording medium can be used efficiently.

* * * * *